United States Patent
Staib et al.

(10) Patent No.: US 8,543,457 B2
(45) Date of Patent: Sep. 24, 2013

(54) METHOD FOR DYNAMICALLY BUILDING DOCUMENTS BASED ON OBSERVED INTERNET ACTIVITY

(75) Inventors: William E. Staib, Coralville, IA (US); Dean Scott Blodgett, Tewksbury, MA (US)

(73) Assignee: STB Enterprises, LLC, Coralville, IA (US)

( * ) Notice: Subject to any disclaimer, the term of this patent is extended or adjusted under 35 U.S.C. 154(b) by 1420 days.

(21) Appl. No.: 11/438,976

(22) Filed: May 23, 2006

(65) Prior Publication Data

US 2007/0282693 A1 Dec. 6, 2007

(51) Int. Cl.
*G06Q 30/00* (2012.01)

(52) U.S. Cl.
USPC ........................ 705/14.52; 705/27.1; 705/26.7

(58) Field of Classification Search
USPC ............................................. 705/26, 27, 14
See application file for complete search history.

(56) References Cited

U.S. PATENT DOCUMENTS

| | | | |
|---|---|---|---|
| 5,675,510 A | 10/1997 | Coffey et al. | |
| 5,796,952 A | 8/1998 | Davis et al. | |
| 5,956,693 A * | 9/1999 | Geerlings | 705/14.53 |
| 6,108,637 A | 8/2000 | Blumenau | |
| 6,115,680 A | 9/2000 | Coffee et al. | |
| 6,138,155 A | 10/2000 | Davis et al. | |
| 6,415,322 B1 | 7/2002 | Jaye | |
| 6,643,696 B2 * | 11/2003 | Davis et al. | 709/224 |
| 6,763,386 B2 | 7/2004 | Davis et al. | |
| 7,085,682 B1 * | 8/2006 | Heller et al. | 702/186 |
| 7,406,436 B1 * | 7/2008 | Reisman | 705/10 |
| 7,441,195 B2 | 10/2008 | Error et al. | |
| 7,603,373 B2 | 10/2009 | Error et al. | |
| 2004/0059746 A1 | 3/2004 | Error et al. | |
| 2004/0098229 A1 | 5/2004 | Error et al. | |
| 2004/0122943 A1 | 6/2004 | Error et al. | |
| 2005/0097008 A1 * | 5/2005 | Ehring et al. | 705/26 |
| 2005/0177401 A1 * | 8/2005 | Koeppel et al. | 705/4 |
| 2005/0216844 A1 | 9/2005 | Error et al. | |
| 2006/0047563 A1 * | 3/2006 | Wardell | 705/10 |
| 2006/0149728 A1 | 7/2006 | Error et al. | |

OTHER PUBLICATIONS

Omniture S-1 filing. http://sec.gov/Archives/edgar/data/1357525/00009501490600238/f18772a1sv1za.htm Retrieved from the internet on Aug. 23, 2010. 134 pages.
Netratings Inc.—Initiating Coverage. Gould, A.S., et al. Ntexis Bleochroeder, Inc. Analyst Report. 19 pages.
Heck, Mike "Chart Your Web site's success"InfoWorld: Product Guide: Coremetrics 2005: Review. Retrieved from http://www.infoworld.com/Coremetrics_2005/56256.html?view=1&curNodeId=0 on Dec. 17, 2006. 7 pages.
Nielsen NetRatings. http://www.nielsen-netratings.com/ Retrieved from the Internet on Aug. 8, 2006. 4pages.
Omniture. http://www.omniture.com/company Retrieved from the Internet on Aug. 8, 2006. 3 pages.

(Continued)

*Primary Examiner* — Rob Pond
(74) *Attorney, Agent, or Firm* — Dorsey & Whitney LLP

(57) ABSTRACT

A method of collecting data from pages viewed by a user of at least one web site, comprises receiving from at least one activity message reporter a plurality of access reports wherein an access report includes content from at least one web page of the at least one web site. Thereafter the method accumulates the received access reports, and formats content from the received access reports in accordance with a document template.

37 Claims, 24 Drawing Sheets

(56) References Cited

OTHER PUBLICATIONS

Google Analytics http://www.google.com/analytics/ Retrieved from the Internet on Aug. 8, 2006. 1 page.

WebSideStory http://www.websidestory.com/ Retrived from the Internet on Aug. 8, 2006. 2 pages.

CoreMetrics http://www.coremetrics.com/ Retrived from the Internet on Aug. 8, 2006. 2 pages.

WebTrends http://webtrends.com/ Retrieved from the Internet on Aug. 8, 2006. 3pages.

Utah Web Analytics Blog http://www.utahwebanalytics.com/blog/category/web-analytics-industry-news/ Retrieved from the Internet on Aug. 8, 2006. 6 pages.

Capterra Management Software http://www.capterra.com/catalogc-management-solutions Retrieved from the Internet on Aug. 8, 2006. 4pages.

* cited by examiner

| Data Element | Class | Description |
|---|---|---|
| customerId | string | supplied by merchant |
| dateTime | string | GMT relative |
| key | string | encrypted token supplied to merchant |
| merchantId | string | supplied to merchant |
| productInformation | XML | merchant specific xml document |
| quantity | integer | - |
| transactionCode | string | code: Add, Remove, Ignore |
| transactionType | string | code: Normal, Customize, Summary |

FIG. 4

Report for dd/mm/yyyy to dd/mm/yyyy

| Catalog Item No. | Views | Average View Duration | View Interest Index 1 | View Interest Index 2 | Select for Inclusion (Y/N) | Number of Sales | Sales Revenue | ROI |
|---|---|---|---|---|---|---|---|---|
| 1234 | | | | | | | | |
| 1123 | | | | | | | | |
| 1112 | | | | | | | | |
| 1111 | | | | | | | | |
| 1223 | | | | | | | | |
| 1224 | | | | | | | | |
| . . . | | | | | | | | |
| 1225 | | | | | | | | |

METHOD FOR DYNAMICALLY BUILDING DOCUMENTS BASED ON OBSERVED INTERNET ACTIVITY

FIELD OF THE INVENTION

The present invention relates to a method for developing a product catalog and other documents from activity messages initiated by web site or Internet service usage. More particularly, the method facilitates developing a product catalog or other documents derived from accumulated, monitored usage.

BACKGROUND OF THE INVENTION

In order to be successful, merchants must be able to reach customers and retain them as long term, recurring clients. For on-line merchants, there are a variety of techniques to obtain customers. For example, a merchant may utilize pay-per-click keyword advertising and pay-per-click comparison shopping referral fees. Because of competition from many merchants and because shoppers on the Internet are often price-sensitive, the merchant may offer a price with a reduced profit margin to achieve better placement on a comparison shopping service. If an on-line merchant often completes sales to new customers at a reduced margin or at a loss, it is especially important to convert customers into repeat buyers. To build long term relationships, merchants may provide coupon codes for future orders, contests, or email newsletters. Another method to build and maintain relationships with clients is through direct mail approaches of sending catalogs, brochures, or postcards to present and prospective customers.

Shoppers generally desire the ability to compare multiple different products to determine the product that best suits their needs. Product catalogs are a good way of providing the shopper the ability to do this comparison. One form of a product catalog is a printed catalog that is sent by a merchant to a potential customer. Printed catalogs, however, are generally expensive, require advanced planning, have pre-determined shipping rules and are hard at times to create. Furthermore, printed catalogs often carry items that do not generate a lot of sales or attract customers to the merchant's store.

Therefore, there is a need in the art for a method that facilitates the efficient creation of a product catalog from on-line stores and the activity of their visitors. The method is extendible to other documents.

BRIEF SUMMARY OF THE INVENTION

A method of collecting data from pages viewed by a user of at least one web site comprises receiving from at least one activity message reporter a plurality of access reports wherein an access report includes content from at least one web page of the at least one web site. Thereafter the method accumulates the received access reports; and formats content from the received access reports in accordance with a document template.

A method of collecting data from pages viewed by a user of at least one Internet site, comprises receiving from at least one activity message reporter an activity report with one or more content pointers that includes information about how to obtain to content from at least one web page or hosted server of the at least one Internet site. The method proceeds by accumulating the received content pointers and asynchronously connecting to the Internet site to retrieve the content pointed to by the content pointer.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

BRIEF DESCRIPTION OF THE DRAWINGS

The detailed description will refer to the following drawings, wherein like numerals refer to like elements, and wherein:

FIG. 4 is a table showing data elements reported from web site activity.

FIG. 6 is a table depicting the fields of a data structure for storing view activity information useable in merchant catalog building.

Figure 9:
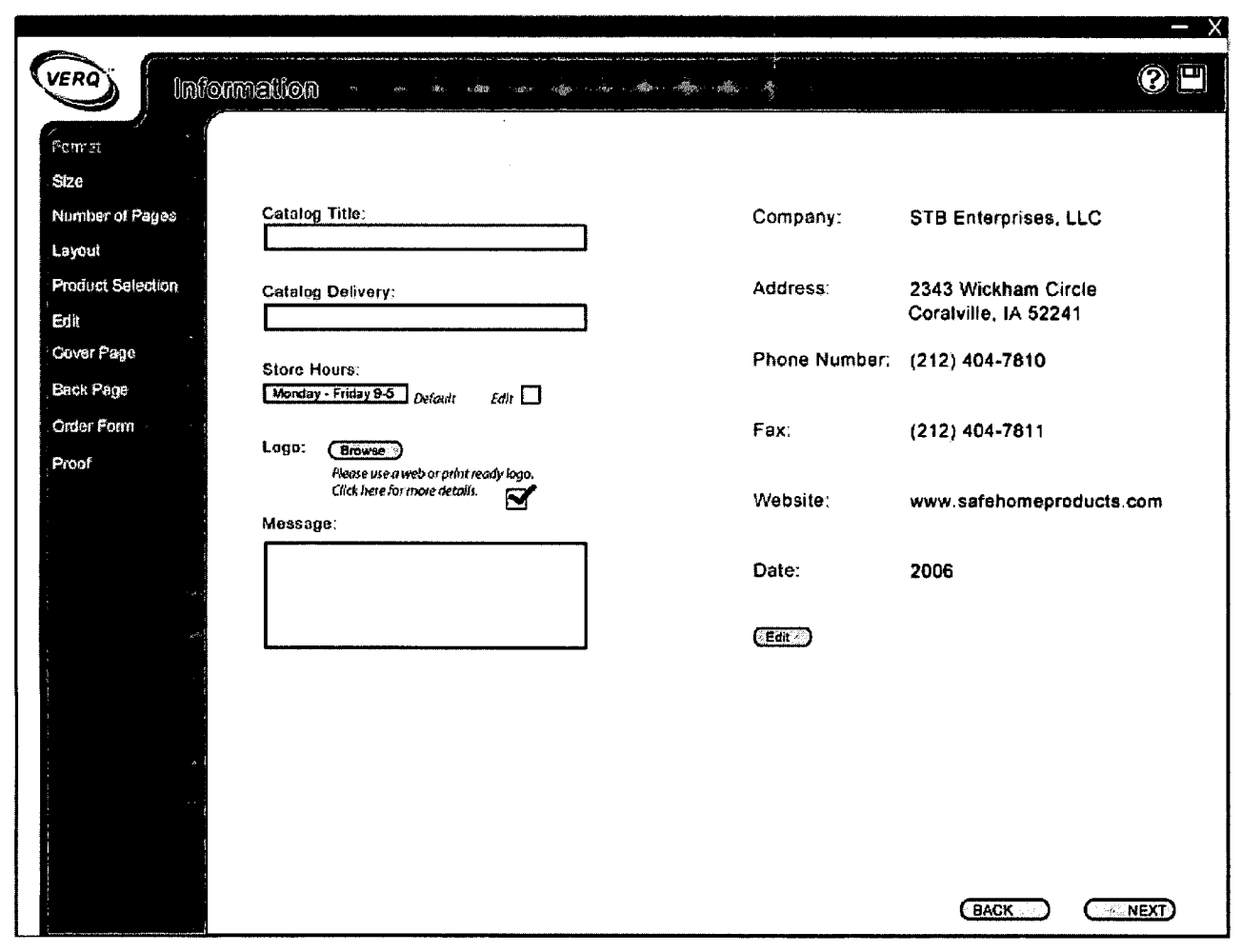

FIG. 9 is a diagram illustrating a screen for one embodiment of an editing tool.

Figure 11:
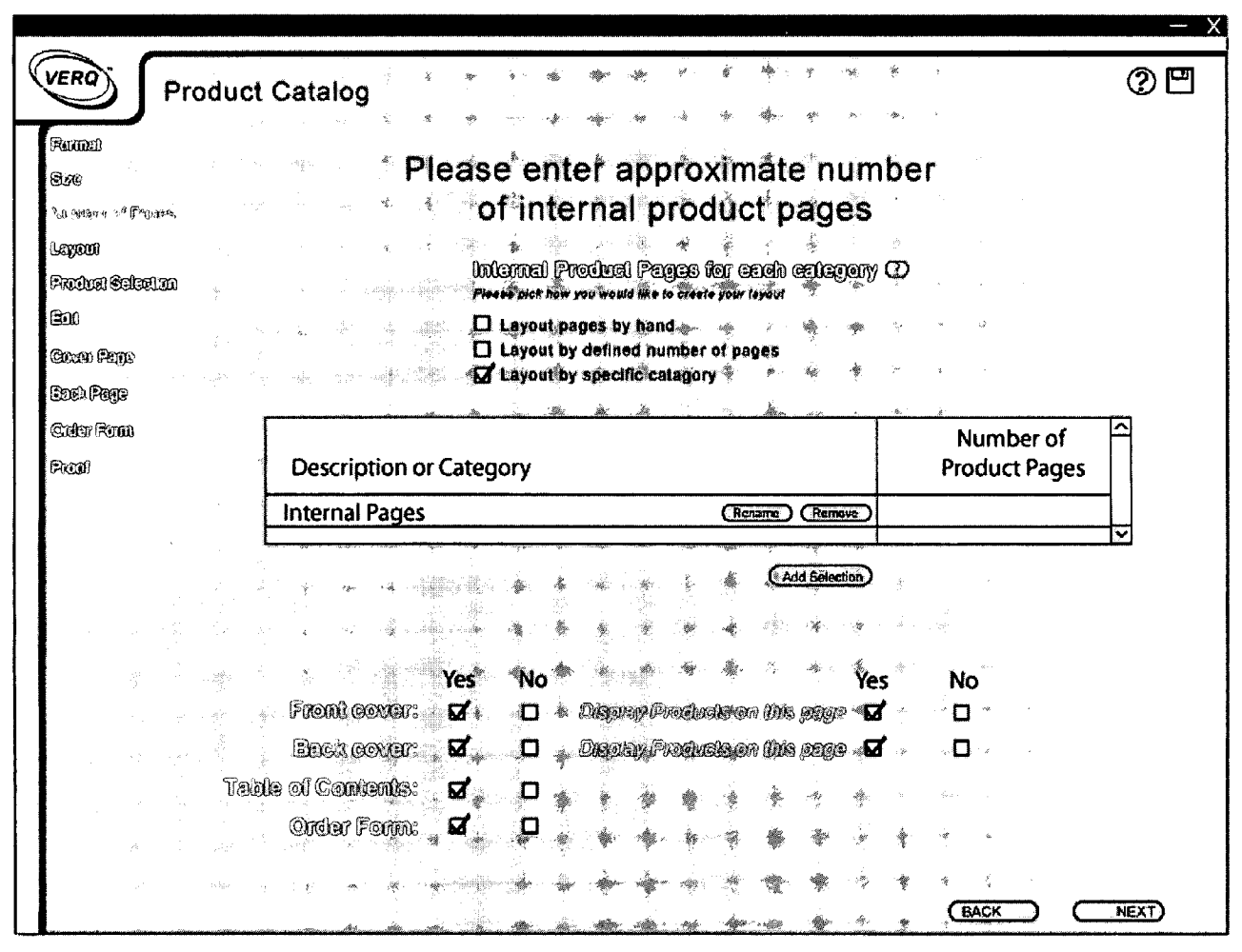

FIG. 11 is a diagram illustrating a screen for one embodiment of an editing tool.

Figure 13:
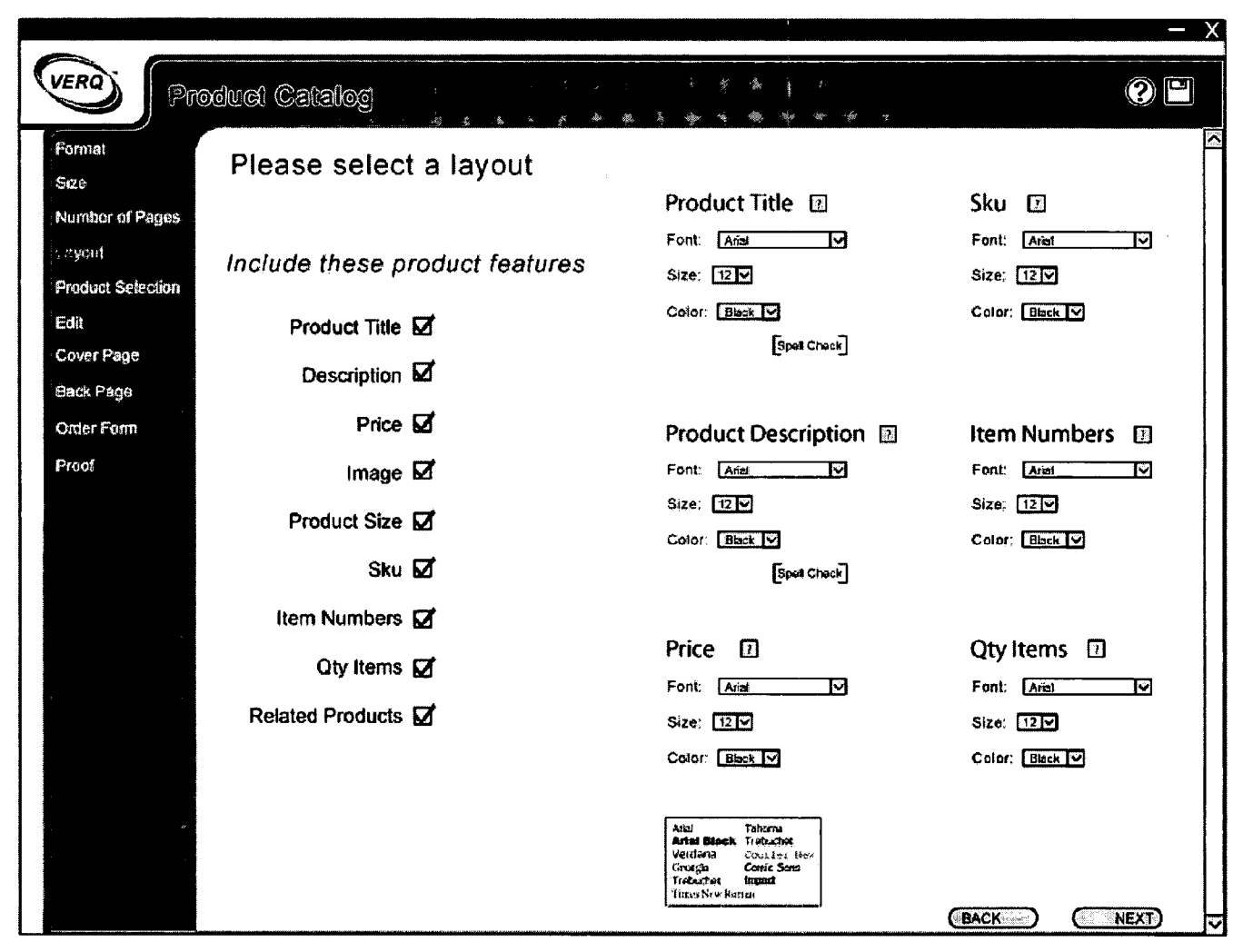

FIG. 13 is a diagram illustrating a screen for one embodiment of an editing tool.

Figure 18:
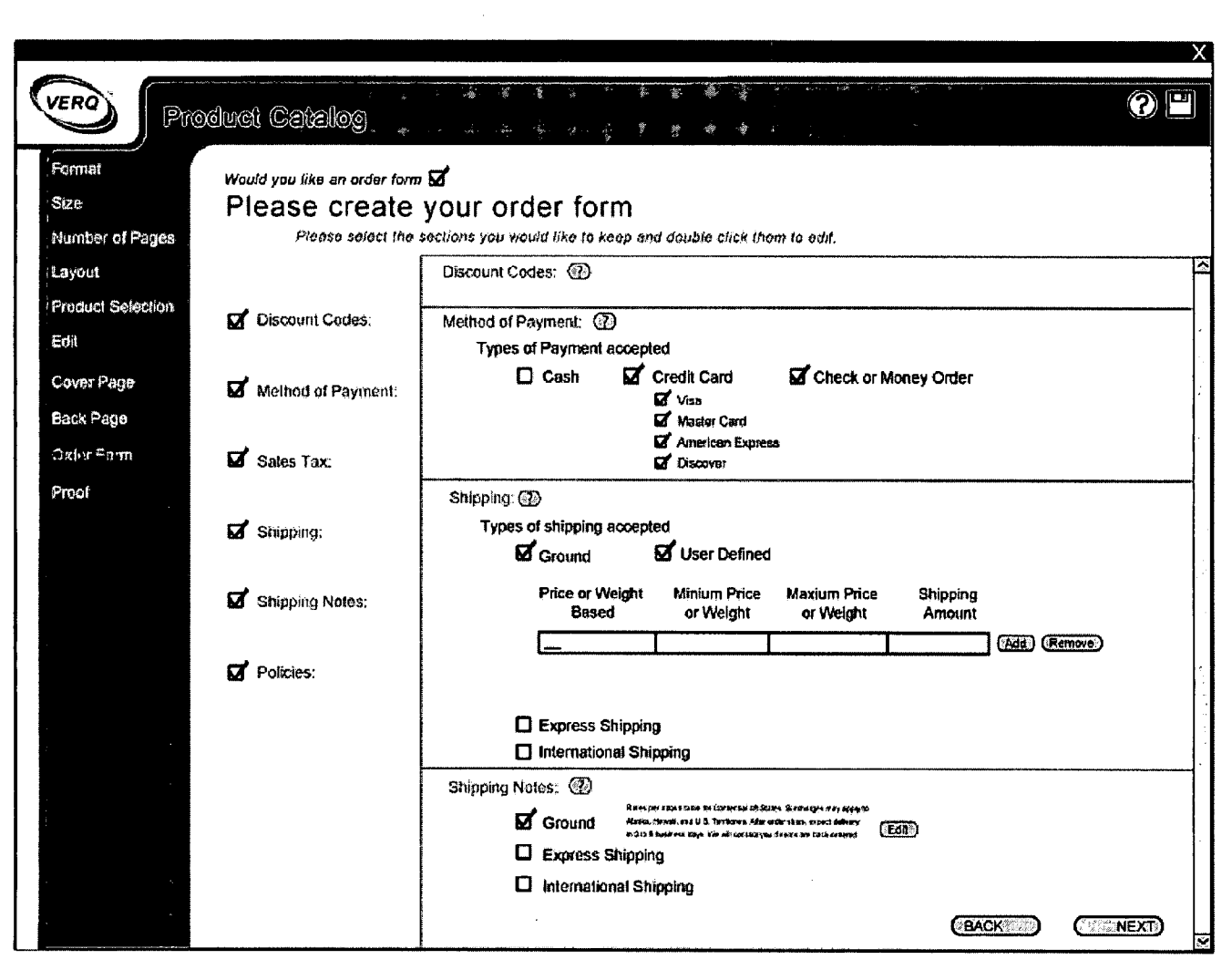

FIG. 18 is a diagram illustrating a screen for one embodiment of an editing tool.

DETAILED DESCRIPTION OF THE INVENTION

Overview. The following describes an Internet-based service (equally applicable on private networks with similar structures) offered to merchants as well as users that builds collections of information by observing web traffic originating from a given web site, multiple web sites or a user's web activity. The service is also more broadly applicable to any Internet or similar network-based service having user activity of interest. Accordingly, as used herein, "web site" includes such services. In one embodiment, the service processes this collection of information into merchant or merchant site-specific marketing materials such as product catalogs, brochures and postcards that a merchant can send to multiple consumers. Product catalogs are any lists, groupings, or arrangements of data concerning products and can be in any form, including printed and electronic. In another embodiment, the service processes this collection of information into customized marketing materials for a single shopper. In another embodiment, the service processes this collection of information into product summaries for the user to view.

Figure 1:
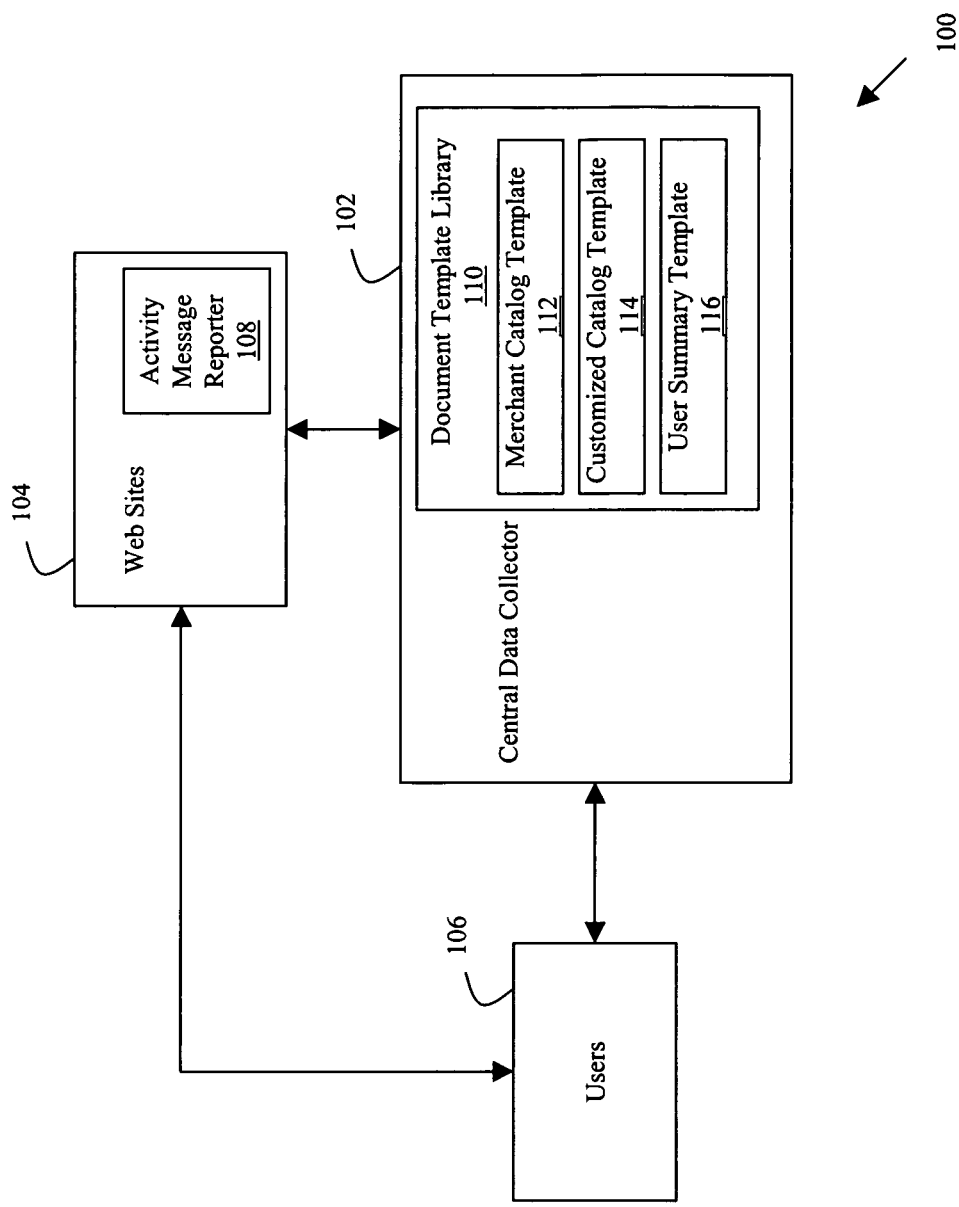
FIG. 1 is a high-level block diagram illustrating one embodiment of a system in accordance with the invention.

System. FIG. 1 is a high-level block diagram illustrating one embodiment of a system 100 for providing the service. System 100 comprises a central data collector 102, one or more participating web sites 104 and at least one user node 106 equipped with a browser connected by the Internet or other means to the web sites 104. In one embodiment, central data collector 102 includes a document template library 110. The document template library 110 contains document templates for various types of documents. In one embodiment, the document template library comprises a merchant catalog template 112, a customized catalog template 114, and a user summary template 116. Documents can be either printed or in electronic form, and include text, graphics, sound, video or any other types of information.

In one embodiment, the central data collector 102 collects information on the product and/or service offerings of a given web site 104 by using an activity message reporter 108 that a web site 104 embeds somewhere on one or more web pages that are served. In one embodiment, the activity message reporter 108 is in the form of JavaScript code embedded on one or more web pages. The activity message reporter 108 can contain or read a finite number of specific data elements about the content of the web page and, in response to a page access or some other reporting trigger included in the code (e.g., activated by a certain level or type of in-page navigation or a minimum viewing time) remotely transmits this information from the user's 106 browser to the central data collector 102.

In one embodiment, the activity message reporter 108 is in the form of a Web service adapter. The server of the web sites 104 could be programmed to send, in response to each particular user's page access by a browser, the specific data elements about the content of the web pages to the central data collector 102 instead of these coming from the user 106. The Web service adapter is a collection of Extensible Markup Language (XML) based Simple Object Access Protocol (SOAP) interfaces that allow operating system independent communication between the web sites' 104 ecommerce platforms and the central data collector 102.

In one embodiment, regardless of the activity message reporter 108 used, the central data collector 102 accumulates and formats the received information over time from multiple users 106. The central data collector 102 has catalog building software adapted to generate a product catalog based on the information collected.

In another embodiment, the central data collector 102 collects information on the offerings of a given web site 104 viewed by a specific user 106 using an activity message reporter 108. Information regarding the content of the web page is transmitted from the user's 106 browser to the central data collector 102. The central data collector 102 accumulates and formats this information over time from activity of the specific user 106. The central data collector 102 has customized offering software adapted to generate a customized product offering document for the specific user based on the information collected.

In a further embodiment, the central data collector 102 collects information regarding a specific user's 106 web activity. This information can come from a particular web site 104 or a defined set of web sites 104. Correspondingly, the central data collector 102 can be implemented with focus on a particular web site 104, a plurality of web sites 104, or on a user's 106 computer. The information collected regarding the specific user's 106 web activity can be processed by the central data collector 102 to provide the user 106 with a tailored summary of the user's web activity with specified web site(s).

Figure 7:
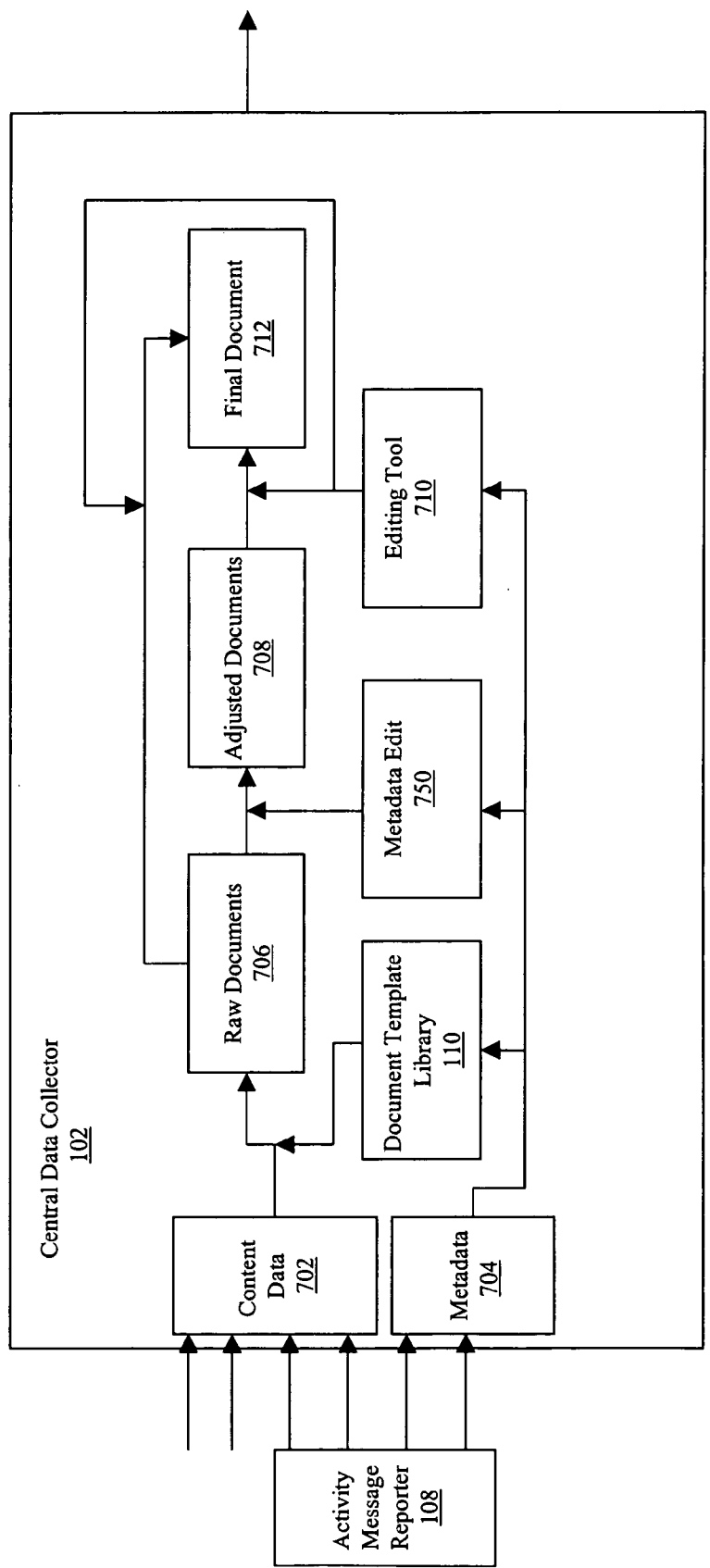
FIG. 7 is data flow diagram illustrating one embodiment of creating a final document.

FIG. 7 is a data flow diagram illustrating one embodiment of using web activity reports to create a final document 712. In one embodiment, the central data collector 102 receives content data 702 from an activity message reporter 108. The central data collector 102 can also receive metadata 704 from the activity message reporter 108. In another embodiment, the central data collector 102 receives content data 702 from scraping at least one web site 104. In one embodiment, scraping is done as described with respect to U.S. Patent Application 60/737,072, filed Nov. 15, 2005 by W. Staib et al. and titled System for Increasing Online shopping Presence. It may be noted that a Javascript system for activity message reporter 108 can direct the scraper or other content-seeking tool where to go and what to look at to improve the quality of scraping. Furthermore, the central data collector 102 can generate metadata 704 from the received content data 702. Central data collector 102 comprises a document template library 110. The document template library 110 contains document templates for various types of documents including but not limited to merchant catalog templates 112, customized catalog templates 114, and user summary templates 116 (see FIG. 2). The document templates contained in the document template library 110 can be adapted using the metadata 704 received by the activity message reporter 108 (if an activity message reporter 108 is used) or generated from the received content data 702. Content data 702 for a merchant web site may include product information, product price, product description or any data contained on a web page. Content data 702 can be in the form of text or graphics. Metadata 704 is data about content data and may be generated from content data, including related data retrieved from other sources. Metadata 704 for a merchant web site includes but is not limited to data regarding the seasonality of offerings on a web page, popularity of products, and percentage of inventory that is regularly accessed.

The content data 702 is accumulated as the central data collector receives the content data 702. The content data 702 is also formatted in accordance with one of the document templates stored in the document template library 110. This accumulation and formatting is used to create at least one raw or draft document 706. In one embodiment, the raw document 706 can be used as the final document 712. In another embodiment, an editing tool 710 can be used to make changes to the raw document 706 to create a final document 712. The editing tool 710 provides a user 106 or merchant the ability to add or remove content, change formatting, or make adjustments to the raw document 706.

Figure 8:
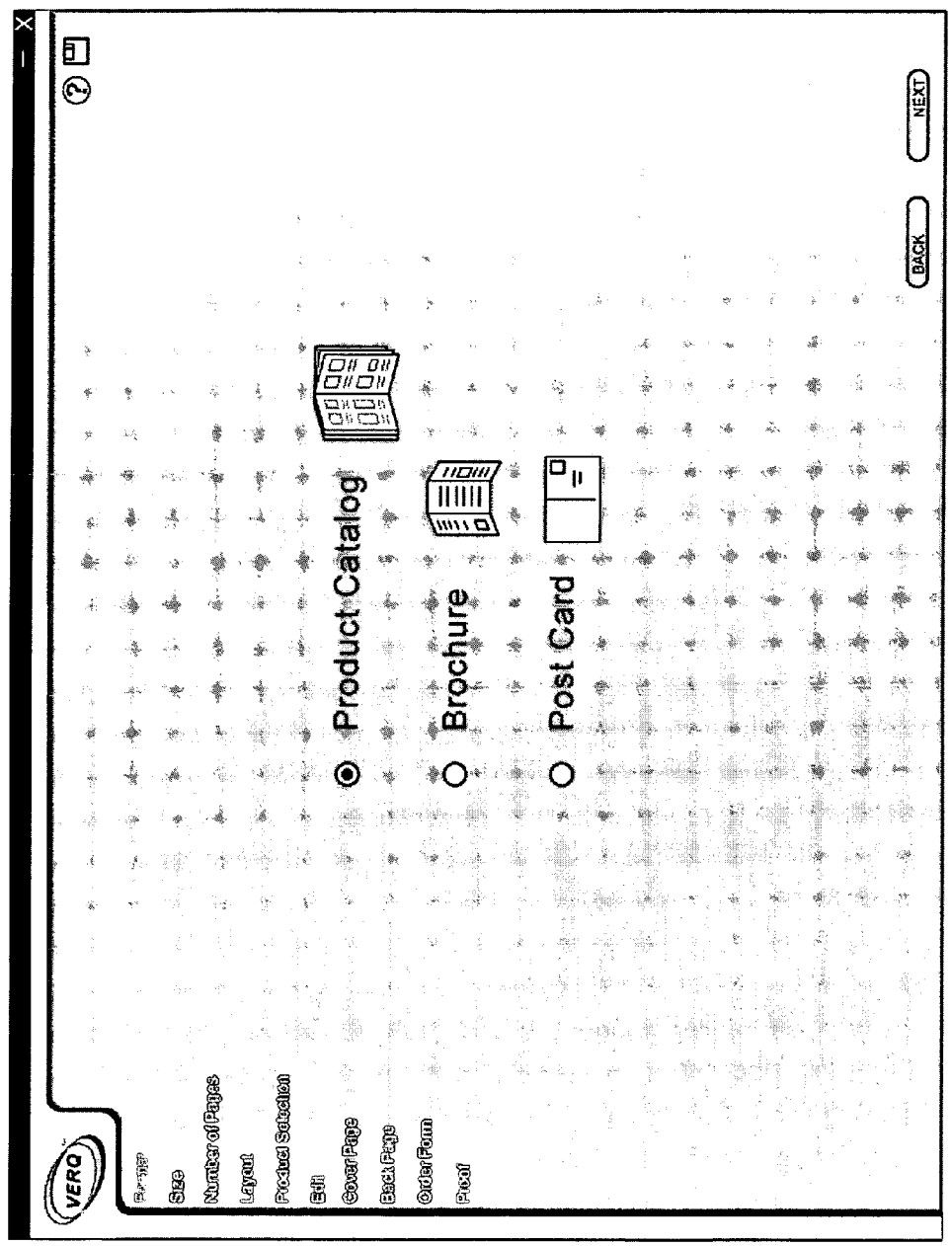
FIG. 8 is a diagram illustrating a screen for one embodiment of an editing tool.
Figure 10:
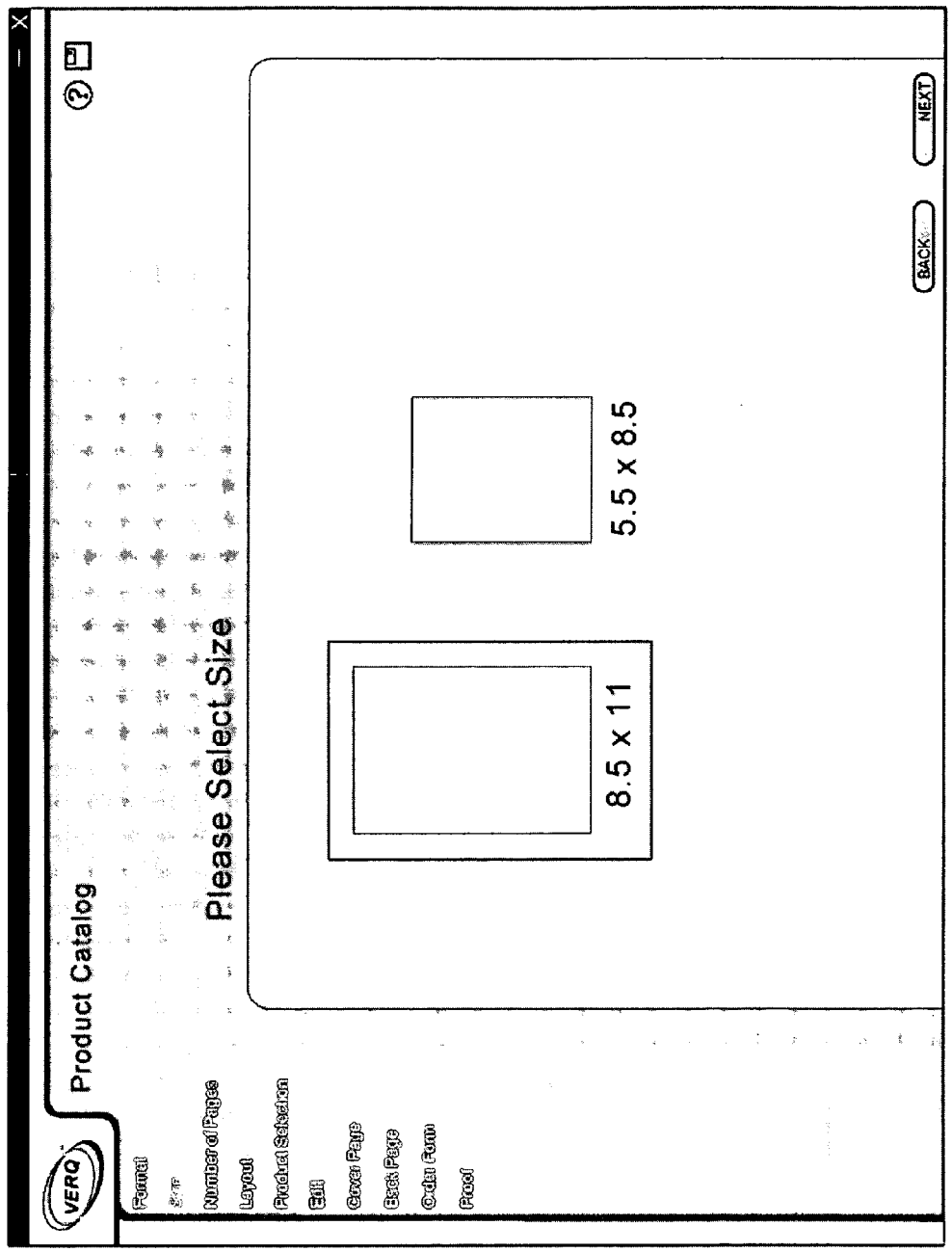
FIG. 10 is a diagram illustrating a screen for one embodiment of an editing tool.
Figure 12:
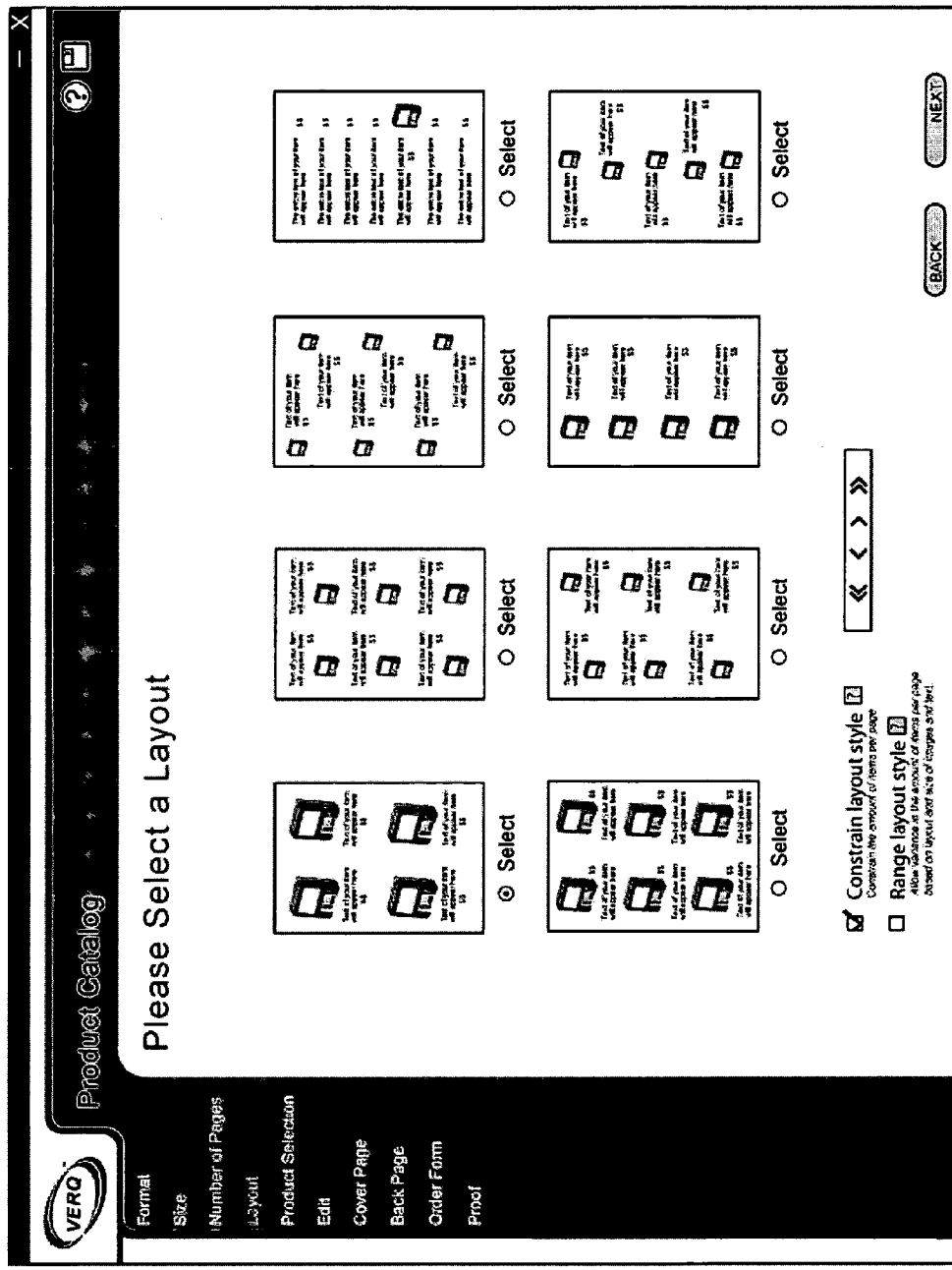
FIG. 12 is a diagram illustrating a screen for one embodiment of an editing tool.

FIGS. 8 through 23 illustrate screen shots for an embodiment of editing tool 710 primarily for documents of interest to an on-line merchant. In FIG. 8 the editing tool 710 allows a user or merchant to select the type of final document 712 to be produced. In this embodiment, the user or merchant has the option to select either a product catalog, a brochure or a post card. In FIG. 9, the editing tool 710 allows a user or merchant to edit the formatting of a document or add additional information to a document. In FIG. 10, the editing tool 710 allows a user or merchant to select the size of the document. FIG. 11 illustrates how the editing tool 710 can allow the user or merchant to choose the number of pages that go into the document as well as select the type of layout he/she wants. FIG. 12 shows one embodiment of various layout options that editing tool 710 can provide to the user or merchant. In FIG. 13, the user or merchant can select the type of product features that he/she wants to include in the document. The user or merchant can also select the type of font, the font size, and the font color for each of the product features that he/she selected.

Figure 14:
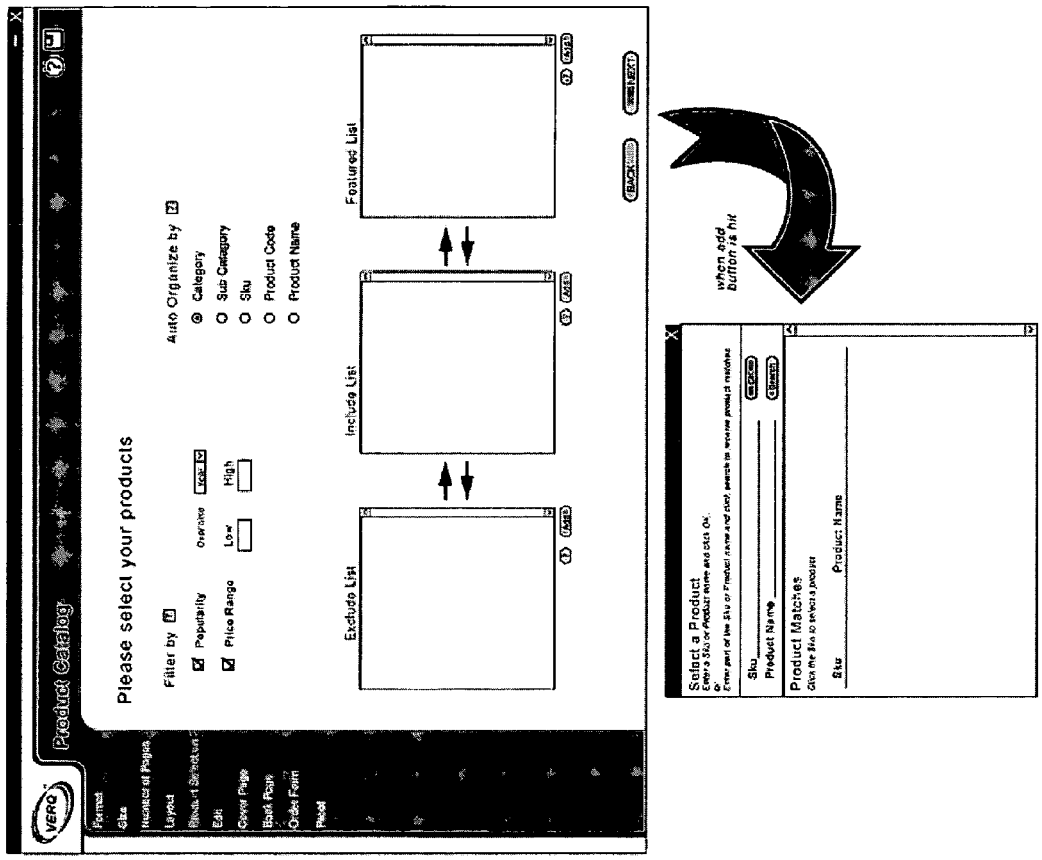
FIG. 14 is a diagram illustrating a screen for one embodiment of an editing tool.
Figure 15:
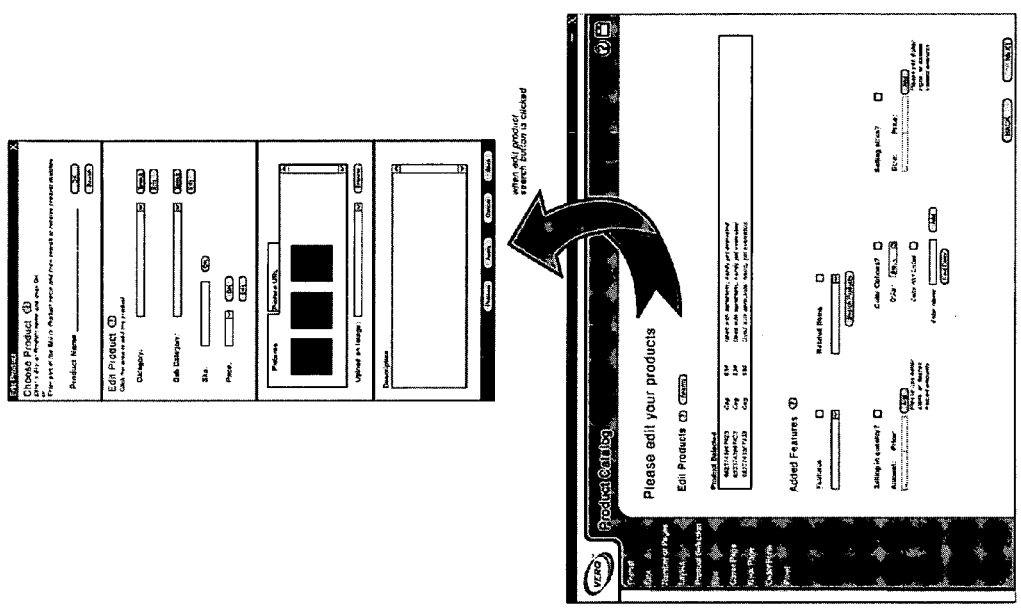
FIG. 15 is a diagram illustrating a screen for one embodiment of an editing tool.
Figure 16:
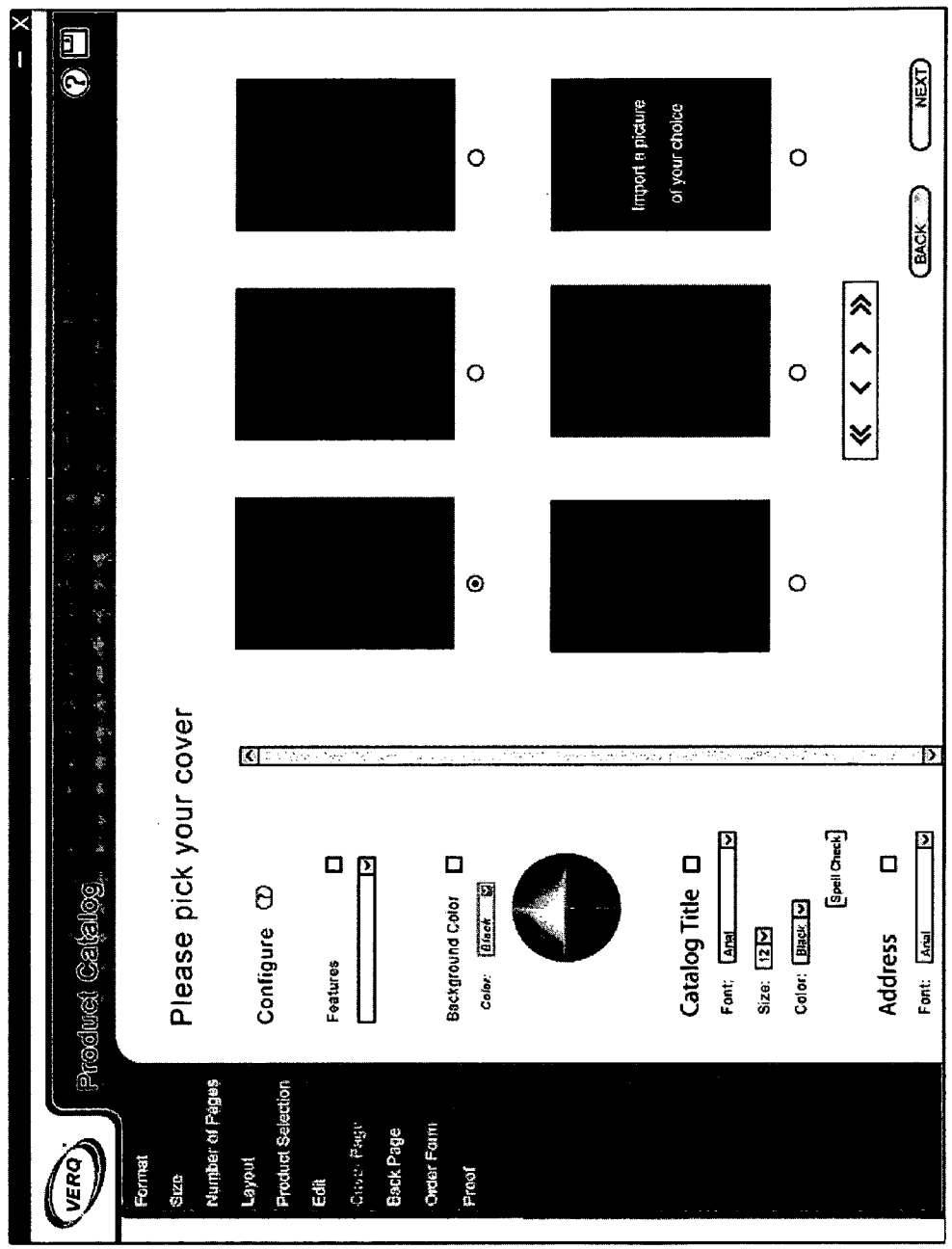
FIG. 16 is a diagram illustrating a screen for one embodiment of an editing tool.
Figure 17:
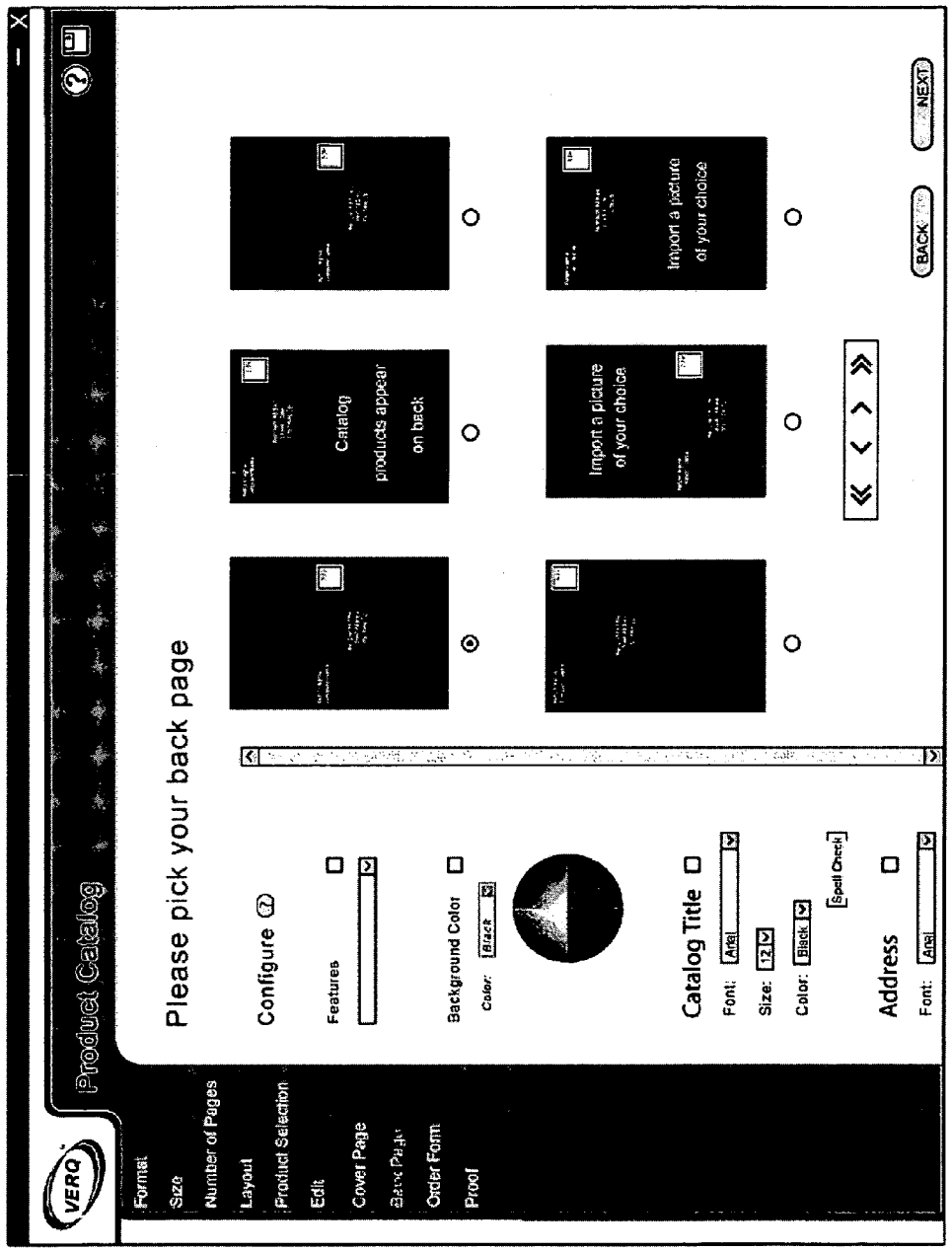
FIG. 17 is a diagram illustrating a screen for one embodiment of an editing tool.
Figure 19:
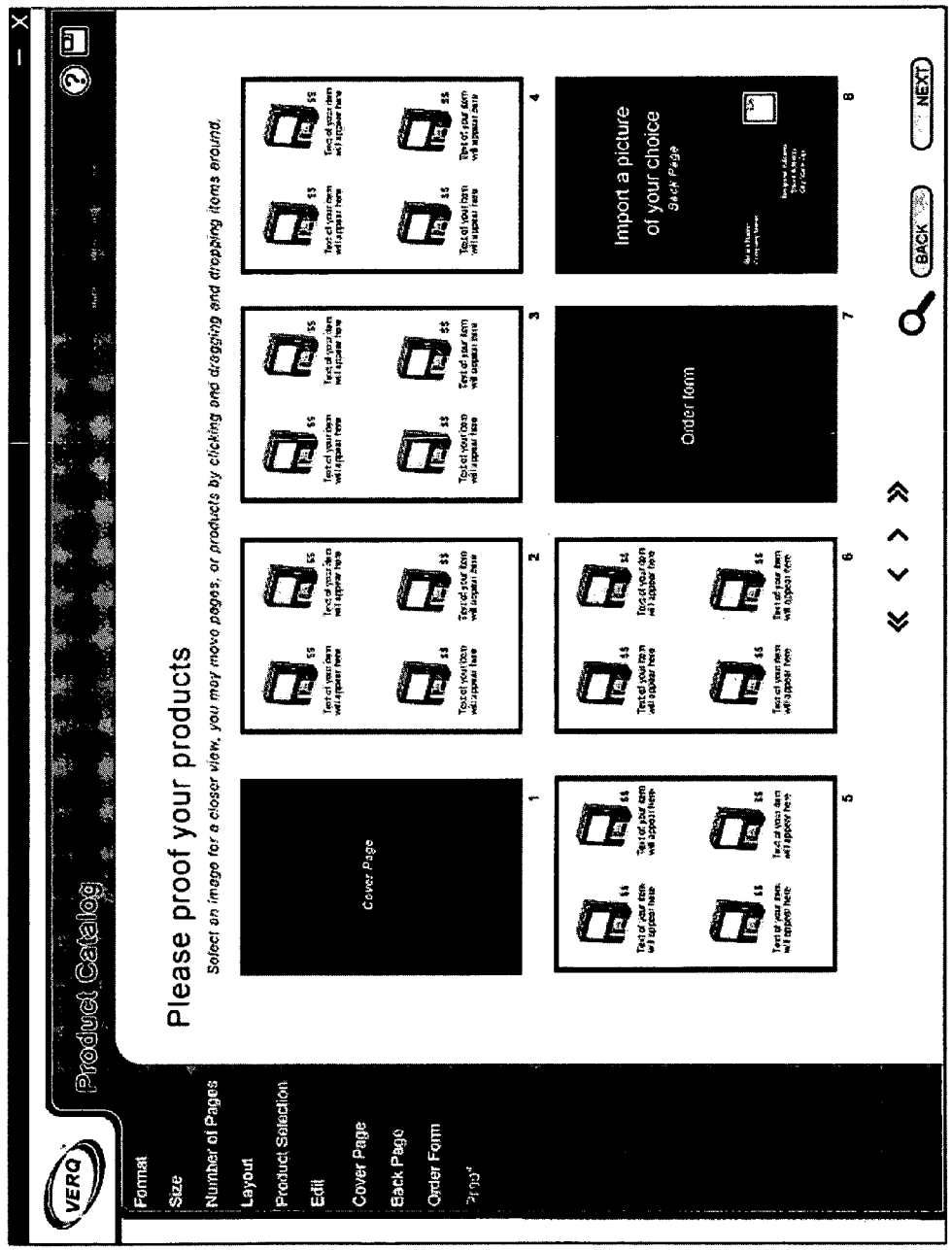
FIG. 19 is a diagram illustrating a screen for one embodiment of an editing tool.
Figure 20:
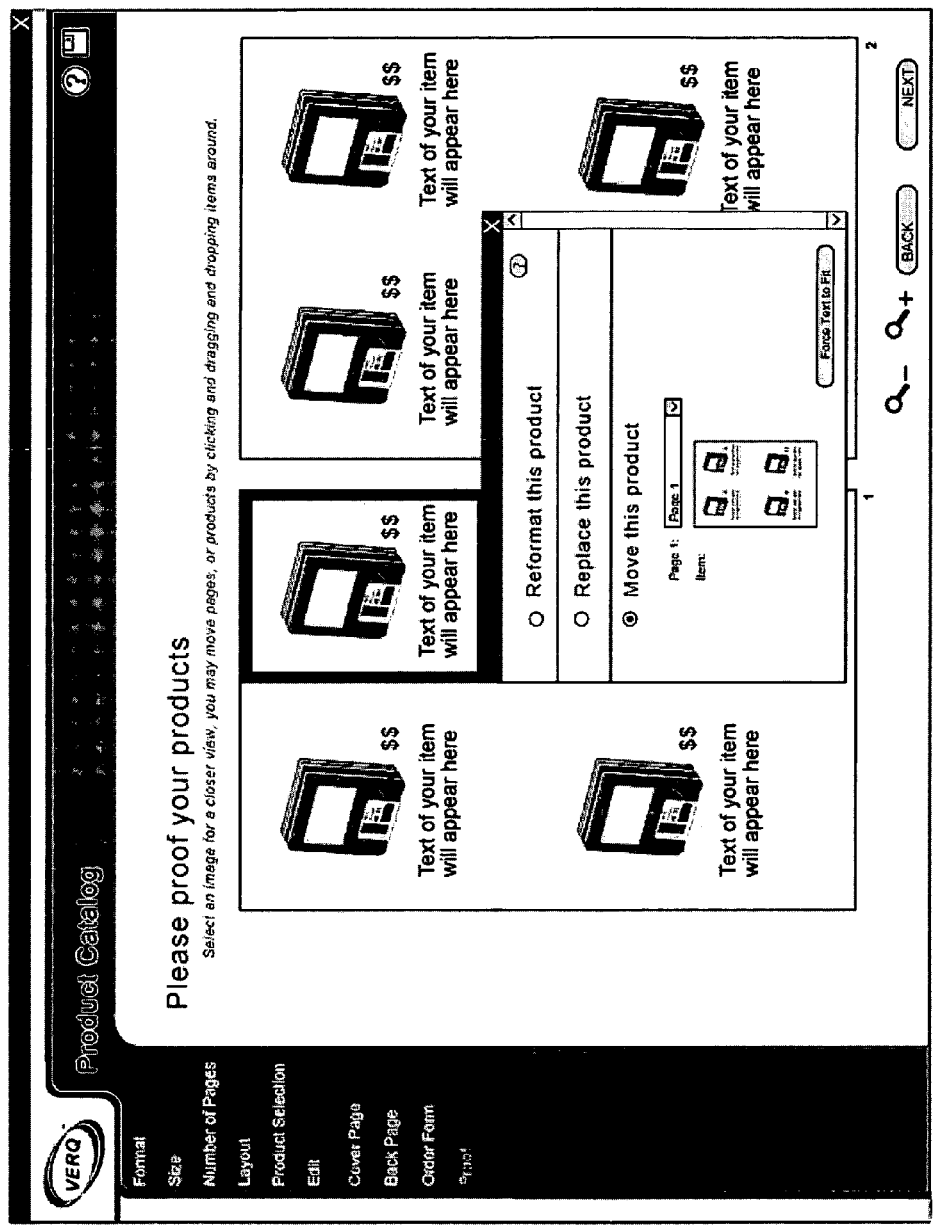
FIG. 20 is a diagram illustrating a screen for one embodiment of an editing tool.
Figure 21:
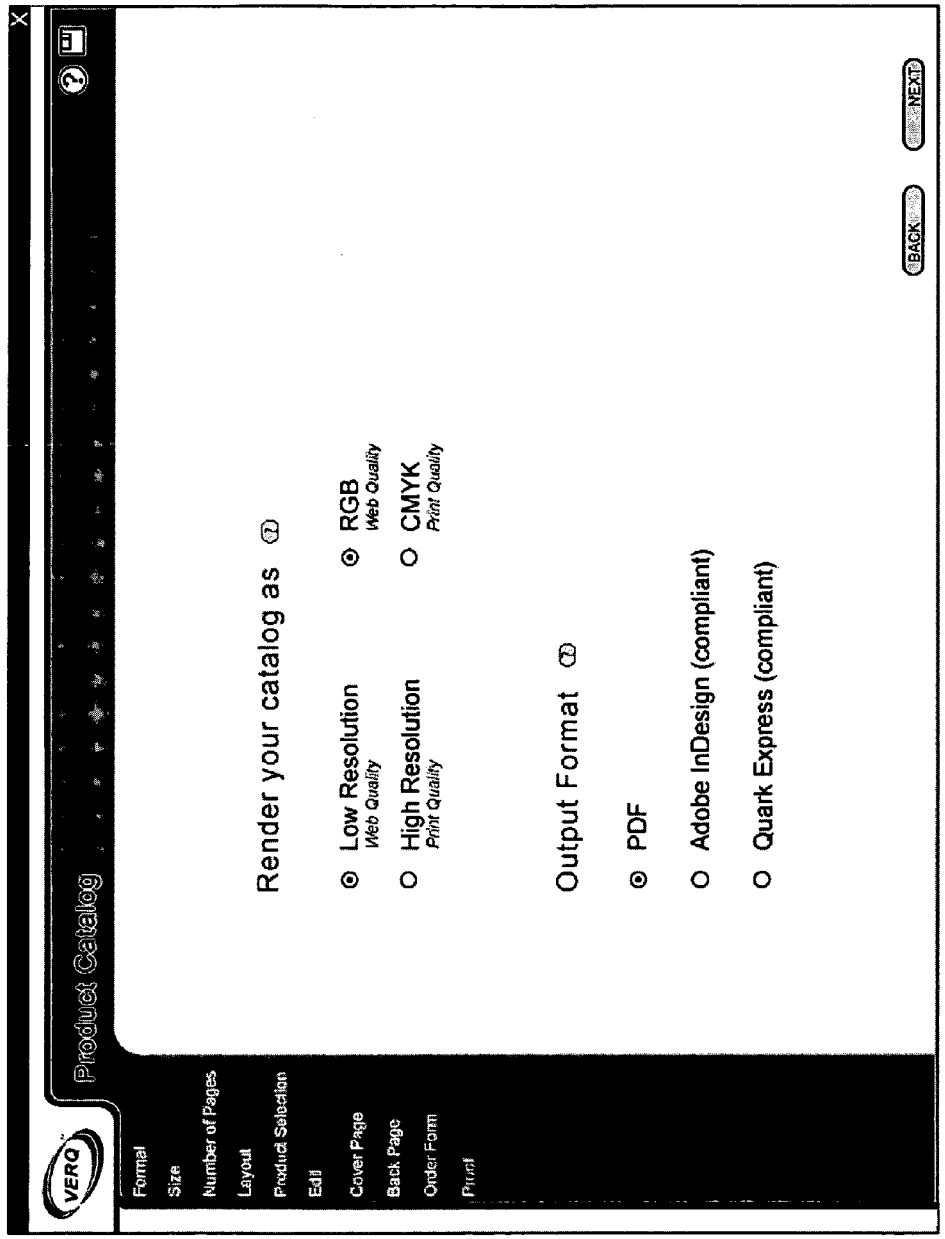
FIG. 21 is a diagram illustrating a screen for one embodiment of an editing tool.
Figure 22:
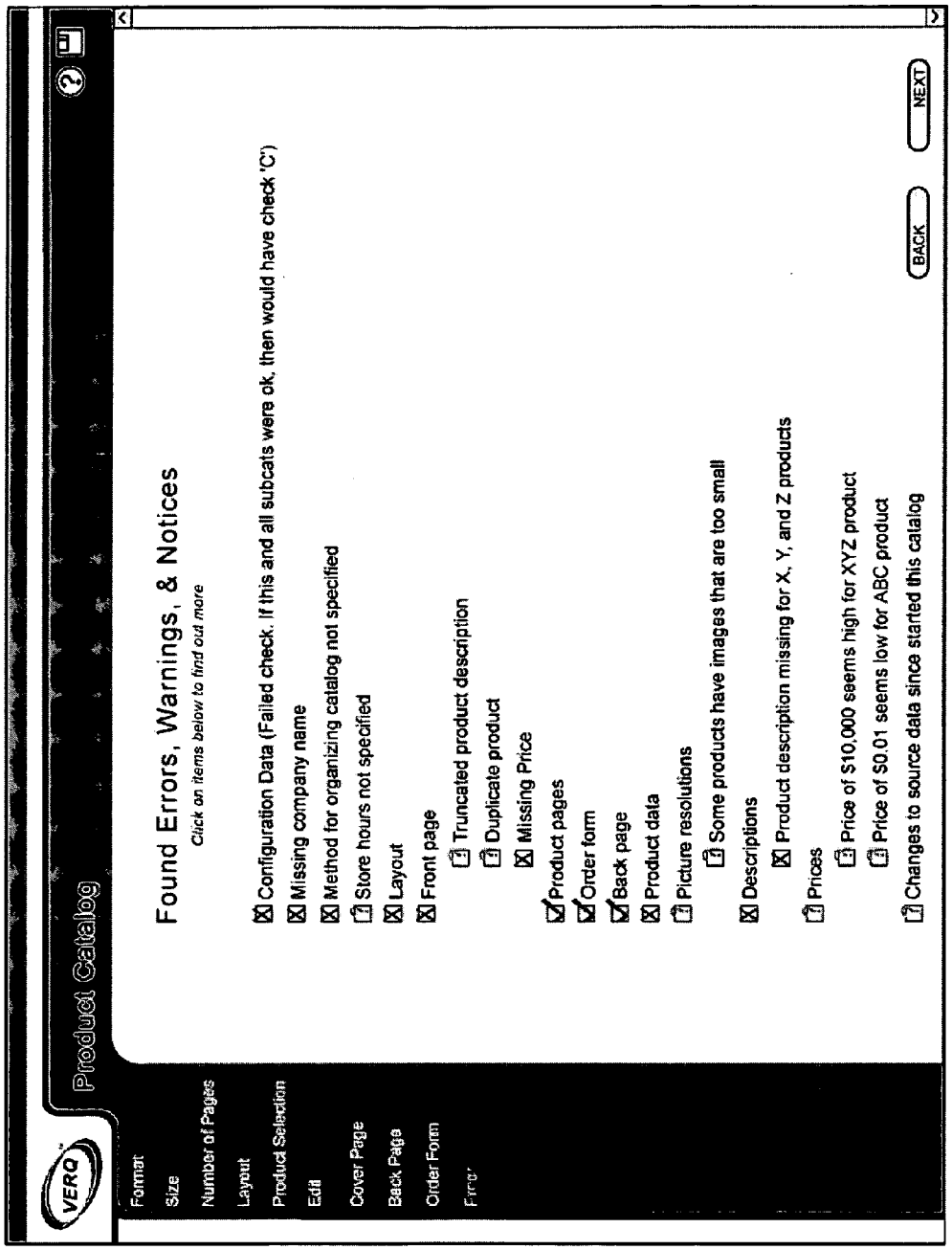
FIG. 22 is a diagram illustrating a screen for one embodiment of an editing tool.
Figure 23:
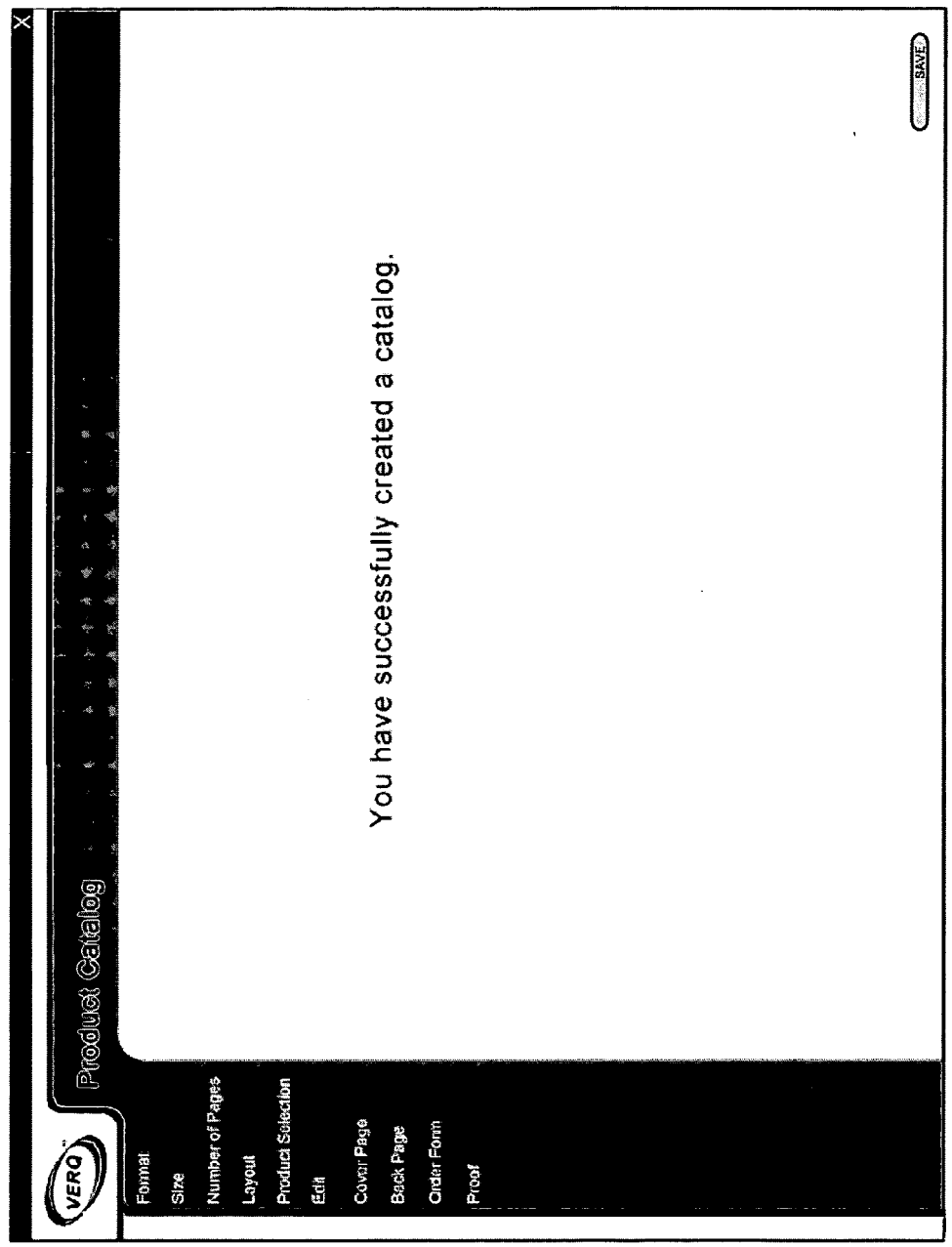
FIG. 23 is a diagram illustrating a screen for one embodiment of an editing tool.

FIG. 14 illustrates one embodiment of filtering products (e.g., selection by popularity or pricing) that editing tool 710 provides to the user or merchant. FIG. 15 shows one embodiment of how users or merchants can edit products via editing tool 710. FIG. 16 illustrates one embodiment of editing tool 710 that allows a user or merchant to select types of covers for the document. The user or merchant can import a picture of his/her choosing as well as change the color and font of the cover. In FIG. 17, the editing tool 710 allows the user or merchant to select the type of back page to be used for the document. The user or merchant can again import a picture of his/her choosing, as well as change the color and font of the back page. FIG. 18 illustrates one embodiment of editing tool 710 that allows a user or merchant to create an order form. The order form can include but is not limited to discount codes, method of payment, sales tax, shipping, shipping notes and policies. FIG. 19 shows one embodiment of editing tool 710 that allows a user or merchant to view the various pages of the document that he/she created. In this embodiment, the pages of a product catalog are shown. FIG. 20 is one embodiment of editing tool 710 illustrating how a user or merchant can reformat the pages of a document. FIG. 21 illustrates one embodiment of editing tool 710 that allows a user or merchant to select the reproduction quality of the document as well as the output format. FIG. 22 shows one embodiment of editing tool 710 that performs an error check on the document created by the user or merchant. FIG. 23 illustrates one embodiment of editing tool 710 that alerts the user or merchant that the document is finished and provides a "save" option. Although FIGS. 8 through 23 illustrate editing tool 710 in the context of a product catalog, editing tool 710 can be used to edit customized catalogs, user summaries and other documents that are created by central data collector 102.

Referring again to FIG. 7, in another embodiment, the raw document 706 is changed by a metadata editing module 750 applying metadata 704 to create at least one adjusted document 708. For example, the metadata edit module 750 may automatically perform product selection for catalog inclusions based on level of sales (e.g., excluding slow sellers) or automatically adjust the order of presentation of products based on rising or falling sales trends (e.g., promoting the prominence of fast sellers). Further, for non-catalog documents the metadata edit module can make determinations to fit content into page requirements or other presentation limits. The adjusted document 708 can be used to create a final document 712. Multiple raw documents 706 and multiple adjusted documents 708 can be generated for each document template and combined to create multiple final documents 712. The final document 712 can be any document containing information including but not limited to a product catalog, a customized catalog and a user summary. Furthermore, the final document 712 can be in electronic form, printed form, or a combination of the two.

Content Pointers and Crawl Controllers. The content data 702 received from an activity message reporter 108 can be the content itself or a content pointer that provides a URL or other address as to where the content itself may be found and copied. Thus, for purposes of this description, "content" or "content data" can mean either the actual content or a pointer or other reference that permits a system resource of the central data collector 102 to find the actual content. A content pointer may then be an address to a web site or internet service or more likely to a page or file within the web site or internet service that permits the content of the page or file to be found and a copy retrieved.

Using a content pointer or other reference may help reduce the amount of data that has to be sent by an activity message reporter 108, where such data tends to slow down a user's page access or have other detrimental bandwidth-related effects. This is important when the content is graphics, larger bodies of text and other content data of a size that may impact transmission time. A further benefit is that the central data collector 102 can accumulate content pointers and can then pursue the actual content more efficiently and at a time that is more convenient for the merchant, the central data collector system operator and/or the operator of the systems from which the actual content data will be derived. These and other benefits of using content pointers are further explained with reference to FIG. 24.

Client-Side Accumulation And Periodic Delivery Of Activity Message Reports. To optimize the performance of the user's page access and reduce communications bandwidth between the activity message reporter 108 and the central data collector 102, the activity message reporter 108 can be implemented so as to accumulate activity data in a client-side cookie or similar means. Then the data contained in such cookie can be sent to the central data collector based upon a level of accumulated contents or on a pre-defined schedule or other triggering event. Similar to the JavaScript implementation, the information stored in the cookie can be encrypted to prevent the user from knowing the exact content or content pointer(s) stored in the cookie.

Figure 24:
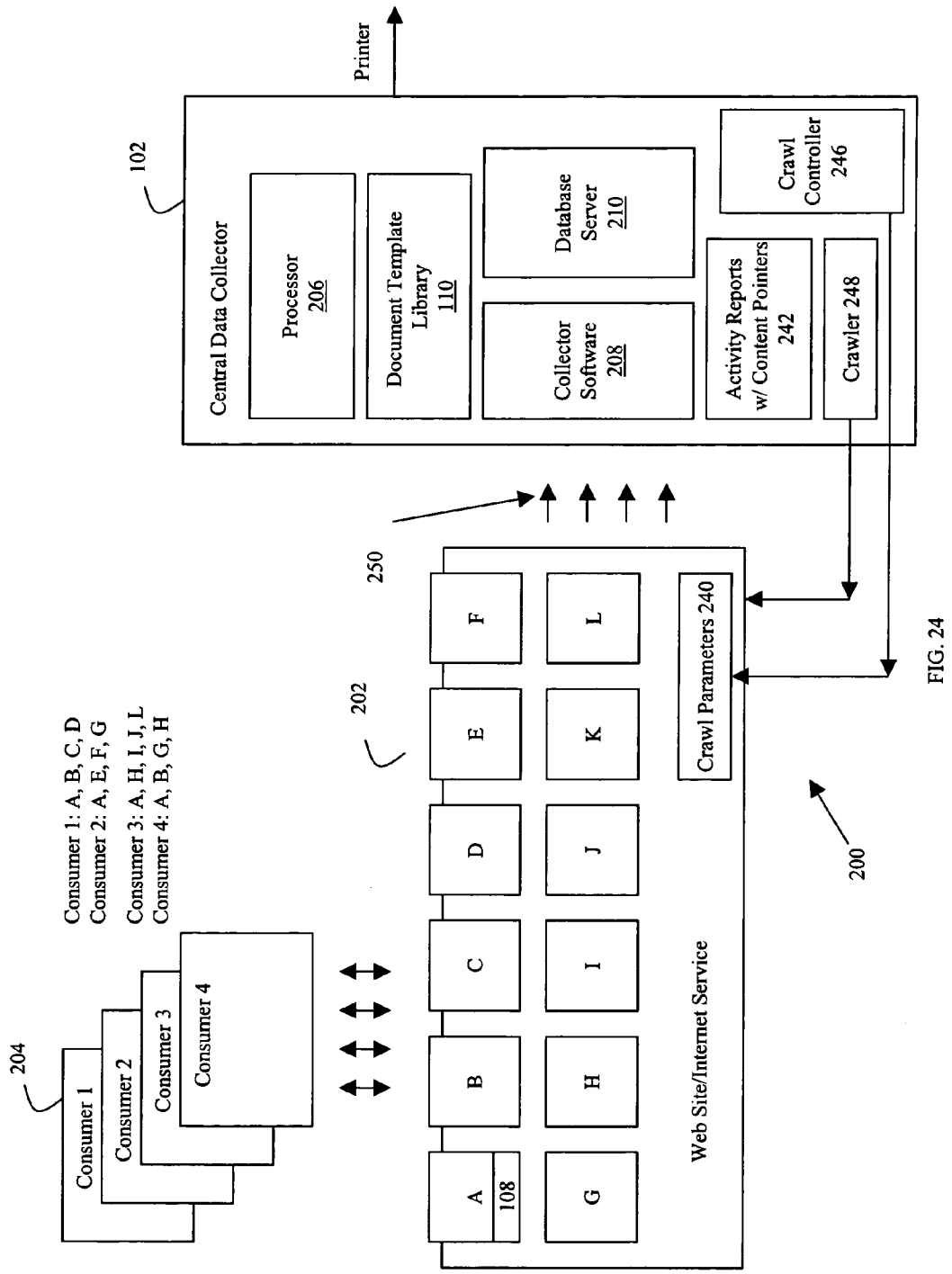
FIG. 24 is a block diagram illustrating an embodiment of a system using content pointers.

FIG. 24 shows a system 200 illustrating one example of how the central data collector 102 collects information by watching user activity via activity message reporters 108 and accumulating content data and metadata generated from the content data. As illustrated, four users 204 interact with a web site 202 (or internet service) containing 12 pages—A through L. Each page has an activity message reporter 108 embedded in the header (for simplicity only one is shown for page A). The pages may be generated through queries to a variety of backend systems, including but not limited to a SQL database, Excel™ spreadsheet, and hard-coded HTML pages.

In one embodiment, each time a consumer 204 makes a request for a page, an activity report 250 is passed to the database server 210 of the central data collector 102. As noted, the activity report may include one or more content pointers instead of actual content data. In one embodiment, these are accumulated in a separate file for activity reports and content pointers 242. As users 204 request various pages, the database server 210 can call on a crawl controller 246 and a crawler 248 to resolve the content pointers into actual content. The crawl controller has code for controlling the asynchronous connection to the web site or Internet service 202 to retrieve content. While the term "crawler" is used here, it will be understood that this refers to code called spiders, bots and other similar terminology that has the ability to retrieve information from a web site or Internet service, from essentially any information resource that can be reached via the internet or a private network. The use of content pointers and a crawler controller 246 makes possible a number of improvements over conventional crawler schemes for collecting information from web sites or Internet services. Conventional crawler schemes tend to be systematically exhaustive and to have no ability to know when the content collected is redundant, e.g., because it was already collected and has not been changed. For example, existing crawlers can infer that content is slow-changing but only after crawling a site several times The crawler 248 can asynchronously connect to the web site (or internet service) 202 to crawl or otherwise retrieve the content pointed to by a content pointer designated by the crawl controller 246. In one embodiment, the content pointers are encrypted such that the user cannot decrypt the activity report messages 250 that contain the content pointers to access the content. The crawler controller 246 can be configured with logic so that the content pointers to a specific piece of content are aggregated, such that only one retrieval request is made to the web site or Internet service containing the content, no matter how many similar or identical content pointers have been received by the collector software 208 in a given period of time.

In one embodiment, it is desirable to give the web site 202 some control over the crawling activity. One way to accomplish this is to have the web site 202 have a set of crawl parameters 240 that will be applied to the activity of any crawler 248. With its crawl parameters 240 the web site 202 can specify by passive means checked by a crawler 248 or, more actively, in an activity report to the collector software 208 when the central data collector 102 service is permitted to or not permitted to query for content identified by one or more content pointers. In one embodiment, the web site or Internet service 202 can specify multiple times when the central data collector 102 is or is not permitted to access one or multiple pieces of content identified one or more content pointers. These times can be, for example, identified low traffic times or other times when resources consumed by crawling are more available.

The crawler controller 246 can also be configured with logic communicating with the central data collector 102 or a scraper that would otherwise systematically survey all available content on a web site to reduce the processing and bandwidth required to retrieve content by not accessing content for which collector software has not received a content pointer. For example, this logic would exclude from automatic survey content that was not accessed by users of the web site or Internet service in a given time interval. The crawler controller 246 can also be configured to check update parameters included in the crawl parameters 240 of a website or Internet service, where the parameters provide information on content that has or has not been updated. The crawler controller 246 can then inhibit retrieval of content that has not been updated.

The crawl parameters 240 also permit the web site or Internet service to establish thresholds of how many requests of a given content file are required in a given period before the central data collector 102 accesses it. Here the crawl controller 246 may check the stored activity reports and content pointers 242 to determine if the applicable threshold has been met before dispatching the crawler 248 to pursue a particular content pointer. A similar way to shift the processing and bandwidth required to retrieve content is to have the central data collector 102 through the crawl controller 246 determine the time distribution for receipt of activity reports from a web site or internet service and, using that information, schedules asynchronous access by crawler 248 to retrieve content referenced by content pointers to that web site or Internet service during low usage periods of the web site or internet service. The time distribution of activity reports may be generated as part of metadata.

In one embodiment applicable to a merchant web site, where the collector software 208 has accumulated content pointers, the merchant whose site is the subject of the activity message reports can specify how frequently and by what methods the content pointers are resolved into actual content, or that timing and method can be controlled by the central data collector system operator. In either case the purpose is to displace crawling that might load the merchant web site at a time when servicing users will not be adversely impacted.

Figure 2:
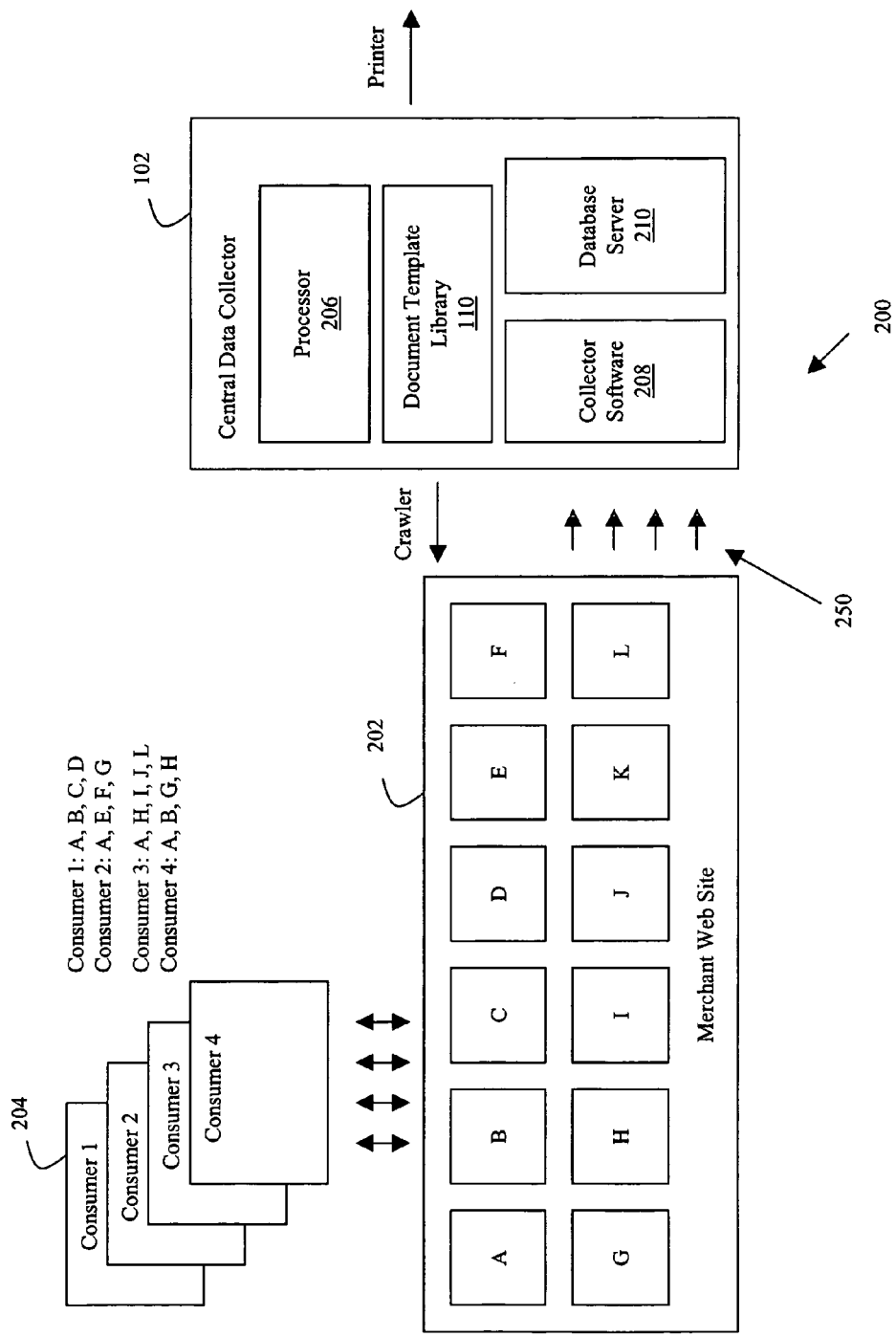
FIG. 2 is a further block diagram illustrating one embodiment of a system in accordance with the invention.

Merchant Catalog. FIG. 2 is a block diagram illustrating one embodiment of a system 200 for building a catalog. System 200 comprises a central data collector 102, a merchant web site 202 (for simplicity only one is shown) and at least one consumer/customer 204. Central data collector 102 includes a processor 206, collector software 208, document template library 110 and a database server 210.

In this embodiment, a merchant sells his offerings over the Internet and desires to produce and distribute a product catalog to a mailing list of previous and/or potential customers. The merchant's offerings are stored in a variety of different data sources, including a Structured Query Language (SQL) database, text files, and hard-coded web pages (not shown) in or linked to the merchant web site 202. As customers 204 visit the merchant's web site 202, they can browse offerings, make selections, and consummate transactions. As customers 204 browse offerings, the web server software queries the appropriate data source for product information, pricing, and options (color, size, etc.). The data is then added to standard HyperText Markup Language (HTML) layout templates provided by the web server software.

The central data collector 102 interfaces with this merchant's web site 202 through an activity message reporter 108. The activity message reporter 108 can be embedded into the product template pages. Each time that the page is requested, the activity message reporter 108 transmits product page activity reports from the customer's 204 browser to the central data collector 102 and more specifically to the collector software 208 and database server 210, which captures content data 702 about the product that was requested. The activity report transmission can be triggered from a variety of factors, including initial access of the product page, dwell time on page, or some in-page navigation that is obtainable and indicates interest of significance. Over time, as web pages are requested and viewed by customers 204, a product catalog for the merchant's goods is built on the database server 210. Because the data used to build the catalog is from actual customer activity on the pages, the product information can be brought together with aggregate information, such as metadata 704, about the offerings, such as seasonality of offerings, popularity of items, and percentage of inventory that is regularly accessed. Accumulating the activity reports and generating metadata 704 also permits or causes information about consumers 204 to emerge, such as repeat visitors, transactional trends (i.e., consumers that look at X also look at Y), and the average number of products viewed.

The central data collector 102 collects product offering information by watching consumer activity reports and inferring the merchant's product offerings with little or no access to the merchant's database of product information. One possible byproduct of the real-time data collection is that only a finite amount of data can efficiently be collected as pages are requested without impacting the page load speed as well as the throughput of the database server 210. In situations where sufficient data cannot be collected in real-time, the central data collector 102 may provide the capability to asynchronously connect to the merchant's web site 202 and crawl the product catalog for missing data elements (i.e., rich product descriptions) to supplement the real-time activity reports.

Another potential byproduct of the real-time data collection is that certain products may not be included in the central data collector's 102 inferred offerings of the merchant's product database. To address this, the central data collector 102 provides for a component to crawl a particular section of a given site to pick up any product offerings that had not been previously observed. Alternatively, the merchant can add an item to the central data collector's database 210 simply by viewing the product on the merchant's web site 202, thereby triggering an activity report.

Sometimes there is information a merchant might want to include in a catalog (or have at hand when building the catalog) but may not want the customer to see, e.g., item cost. The central data collector 102 provides at least three options to the merchant in this scenario. The first option for the merchant is to pass information in real-time to the database server 210 of the central data collector 102, preferably in an (public key) encrypted format. Alternatively, in batch mode the central data collector 102 provides a component for uploading information in an XML or similar format. This can be done using a Web services approach as described above. Also, the XML or .CSV or similar format could be transferred to the central data collector 102 via an FTP protocol or an HTTP POST to a specified URL at the central data collector 102. In the third option, the central data collector 102 provides for a second batch mode option to "crawl" a designated password-protected section of the merchant's web site 202 (or ftp location) that contains the desired information or the merchant might enter data by hand using a web interface.

FIG. 2 illustrates one example of how the central data collector 102 collects product offering information by watching consumer activity via activity message reporters 108 and inferring the merchant's product offerings without access to the merchant's database of product information. As illustrated, four customers 204 interact with a merchant web site 202 containing 12 product pages —A through L. Each product page has an activity message reporter 108 embedded in the header. The product pages are generated through queries to a variety of backend systems, including but not limited to a SQL database, Excel™ spreadsheet, and hard-coded HTML pages.

In one embodiment, each time a consumer 204 makes a request for a product page, summary information is passed to the database server 210 of the central data collector 102. As consumers 204 request product pages, the database server 210 begins to obtain a unified picture of the merchant's offerings even though the raw data is stored in disparate back end systems. This is referred to as inferring the product catalog. In this example, all product pages with the exception of product "K" are requested at least once in the interval used for inferring. Product "A" is requested by all consumers 204, and product "B" by 50% of all consumers 204.

After a given period of time (the period will vary depending on the volume of site traffic) the database server 210 has inferred a sufficient portion of the product catalog such that it can be used to generate marketing materials such as a product catalog. At this point the merchant may log in to the central data collector 102, and use an editing tool 710. The merchant through the use of the editing tool 710 can view the proposed catalog data and initiate an asynchronous procedure to crawl the merchant's web site 202 to fill in any missing data points in the inferred product catalog. In this case the crawl process may pick up content data 702 such as rich business descriptions (which are too big to transmit in real-time from browsers) and current pricing (which may have changed from the time the data was initially passed). The inferred product catalog is used as a guide for which products to crawl. Further, through a report provided by the central data collector 102, the merchant will be able to notice that product "K" was not included in the inferred product catalog and can manually add it to the inferred catalog, e.g., because of seasonality or inventory levels. Alternatively, sales or traffic data from outside the inferring process can be used to make an informed decision about the value of including the product "K" in this particular catalog, given its audience. expected sales and incremental costs of including "K".

Once the inferred catalog has been enhanced by the asynchronous update, the central data collector 102 provides a user friendly interface in editing tool 710 for completing design of a product catalog. Also, if the merchant constructs its web pages to provide product category information (e.g. 'Health->Blood Pressure->Wrist Monitors') via one of the real-time (JavaScript) or batch (uploaded or "crawled") modes, the central data collector 102 can use this information to organize the catalog display by product category.

The information gathered by the reports from the message activity reporter 108 can be stored and used in a variety of forms. Its importance is that it shows actual browser access activity for pages that show a merchant's products. This makes it rich in data on potential and actual customer interest in specific products. In addition, this information can be combined with related product sales information from other merchant sources. In one embodiment, a merchant can be presented with a catalog configuration interface that shows for one or more products (and preferably for each product) data reflecting the frequency and quality of the collected web activity. This web activity summary can include number of browser views, view duration, frequency of repeat visits, or one or more indices or measures of viewer interest inferable from browser use, such as viewing time on the page, extent of any in-page navigation (such as use of a drop-down list) and the like. Such information can be presented in chart or table form so that activity (or lack thereof) for all or a group of catalog-candidate products can be viewed. Alternatively, each catalog-candidate product can be presented accompanied by an activity summary for real-time views of its specific product page. From either source of information, the merchant can be presented an option to select to include or not include the product, adjust pricing or make other catalog adjustments responsive to reported data.

In another embodiment, the data on page viewing new activity is presented to a catalog filter agent that can be configured with rules for product inclusion or exclusion. These rules may be applied to automatically make a selection of catalog-candidates.

FIG. 6 shows in simplified form a tabular data structure for page viewing activity information, usable either by a catalog filter agent or as part of a merchant user interface. The data included in FIG. 6 can be supplemented with data from other sources that are relevant to the catalog inclusion selection. For example in FIG. 6 the table shows a catalog item number, average view duration, a first view interest index, a second view interest index, a select for inclusion option, number of sales, sales revenue and ROI. In one embodiment, the table shows an estimate of the moving average of sales using filtering techniques such as newfilteredvalue=oldfilteredvalue*theta+(1−theta)*newrawvalue. Theta is a number 0 to 1 that can be calculated to approximate a filter of a given time constant, for example, one month. This filtering approach assumes periodic sampling of sales (e.g., once per day), but more sophisticated filtering approaches may be used, or the raw data could be stored to have actual rather than approximated trends.

With this collection of inferred product offerings, any web activity summary by product page, and further knowledge of merchant's category taxonomy and product sales history, the central data collector 102 is able to select automatically and organize the merchant's product data to produce a proposed print catalog. The merchant may then override product selection or re-arrange product images or text through an editing tool 710. This may include selections based on any web activity summary information present. The central data collector 102 builds a final document 712 such as a final catalog, brochure or other marketing document suitable for production by a commercial printer.

To produce a commercial quality printed document, the central data collector 102 provides a user friendly tool that allows a merchant easily to produce high-quality marketing documents using templates of commonly requested pages. For example, the central data collector 102 catalog tool provides for front and back cover pages, tables of contents, indices, and page numbers. Further the central data collector 102 catalog tool allows the user to easily set colors and manipulate the layout of their product inventory such that their products are presented in the most favorable light. The central data collector 102 catalog tool provides the ability to preview the output on screen as well as create a test print using PDF output. (The test print may be in a lower-resolution or contain a watermark to avoid abuse.)

In the particular example shown in FIG. 2, the central data collector 102 may flag product "A" as a popular item and if desired by the merchant, product "A" will be featured in the product catalog, positionally, by presentation size or by a promotional offer. This is important because printed catalogs are expensive and limited in size compared to web catalogs, and therefore, merchants only want to show products that are top sellers or that the merchant otherwise expects will lead to substantial sales. Because the system 200 receives product information directly from a merchants' consumers 204 via the activity message reporter 108, the system 200 is able to discover what are the most popularly viewed and purchased products. A catalog inferred in this manner may thus be a subset of total offerings and will be derived from activity of the audience to whom it will be directed.

Once the draft catalog is laid out, the merchant will be able to preview the output and make any minor adjustments required. When the merchant approves the product catalog, the central data collector 102 formats the output such that it can be processed directly by a commercial printer, and if desired, distribution to a supplied list of names and addresses. At the merchant's option, the central data collector 102 catalog tool will directly route the output to a production facility that will print and/or distribute the marketing materials on the merchant's behalf. There is no need for the merchant to be familiar with catalog print formats (i.e., Quark Express)—he/she simply needs to be able to approve the visual layout of the content. (The system also may just go direct to creating a catalog quality output in the service-offering situation discussed below, where a scraper is used to gather a sampling of a merchant's offerings and that sampling is used to send promotional sample catalogs that display the capability of the service to a potential merchant customer.)

The central data collector 102 is designed to guard against fraudulent product data or objectionable content being added to the inferred data reported to the database server 210. In one embodiment, the central data collector 102 is designed to only accept incoming transactions or other activity reports from domains that subscribe to the central data collector 102. All other messages are ignored. In another embodiment, each transaction or other activity report passed to the database server 210 of the central data collector 102 must contain a site specific authentication token that has been encrypted with public key encryption technology.

System 200 is valuable, as it eliminates the need to install costly and complex integrated commerce solutions in order to create product catalogs. System 200 allows merchants to provide current product offering and activity data to the central data collector 102 continuously without installing code on the merchant's server (which may be hosted by a third party). To work with the central data collector 102, merchants need only insert a minimal amount of JavaScript into each page from which an activity report is desired. This code may contain data fields that need to be filled in by the merchant through a database query at the time of page generation. This means that the merchant does not have to write special processes to generate/transmit data and he/she does not have to install large software on the merchant's systems.

Figure 3:
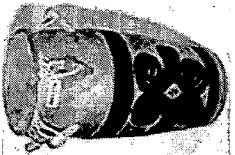
FIG. 3 is a diagram illustrating one embodiment of an activity message reporter embedded in a web site.

JavaScript. FIG. 3 is a diagram illustrating one embodiment of an activity message reporter 108 in the form of JavaScript embedded in a web site. FIG. 4 is a table showing data elements reported from web site activity. As described above, the central data collector 102 collects information on the offerings of a given web site 104 by using a section of JavaScript code that a web site 104 embeds somewhere on one or more web pages that are served. The JavaScript code captures a finite number of specific data elements about the content of the web page and remotely transmits this information from the user's 106 browser to the central data collector 102. Examples of data elements include but are not limited to time, date, merchant ID, customer ID, IP address, referring source/affiliation (from which search engine or other service did the customer arrive at the merchant's site), referring keyword/query string, UPC or EAN code, manufacturer, brand, manufacturer's product code/sku, desired or prohibited time(s)/date(s)/day(s) of week for crawler to access data referred to by content pointers, product code, product name, product description, price, quantity available, item cost, product category, quantity sold and purchase or view flag (used to determine how often products were purchased or viewed). Also possible inclusions are merchant's unique order ID number, tax amount, total transaction price, shipping cost, city, state or province, country, sku number (could be different from product code). Each data point may be the data itself or a pointer to the data (e.g. a url, ftp site, or other remotely-accessible internet service). A pointer to the content data allows for the data to be accessed asynchronously, securely (without possibility of interception by the user's browser), and can ensure that data is obtained only when it has been updated by the merchant's site and/or accessed by users of the merchant's site. For example, item cost and product description information may be sent as a content pointer for security or efficiency reasons, respectively. Further, via this method, the merchant may control when this data is obtained by the central data collector 102. The merchant can establish thresholds of how many requests of a given content data is required before the central data collector 102 accesses it and can ensure that any asynchronous access occurs during low usage periods of the merchant's site. FIG. 4 illustrates a few of the data element examples listed above, the type of class the data elements are categorized as, and a brief description regarding the data elements.

In one embodiment, the activity message reporter 108 is in the form of a Web service adaptor. In this embodiment, Cgi, perl, active server pages, or .NET are used to implement the Web service adaptor and all are run at the web site server. Likewise, Cgi, perl, active server pages, or .NET can be used to implement FTP or HTTP POST of data.

In another embodiment, the activity reporter and data collector exist on the same server or at the same datacenter as does the web site. The implementation of the activity reporter is a process such as an ISAPI filter that interfaces with user requests to the web site. Alternatively, the activity reporter can be a program that interprets web server log files for the web site and stores product view and purchase activity information into the central data collector 102. In this approach, most if not all of the same data fields can be gathered, as is done in the JavaScript or Web service adapter embodiments.

In another embodiment, a security signed Java Applet, signed ActiveX component or any technology that permits a web page to contact another site without further interaction can be used to have data transferred to the central data collector 102.

In a further embodiment, an <IMG> image link from a browser page to a dynamic image on the database server 210 of the central data collector 102 is used. The parameters to the image would pass the data from the user's browser to the central data collector 102.

In one embodiment the system as shown in FIGS. 2 and 7 is used to prepare a document by which the operator of a service such as shown in FIG. 2 can prepare a sample to demonstrate to a particular merchant the utility of the services. In this method of introducing a merchant to the possibilities of the service, the service operator begins by collecting content data by scraping at least one merchant web site connected to the target merchant and accumulating the content received from the scraping at the central data collector 102. The service operator then uses this content with the document template library 110 to produce a raw document 706, in the form or a sample catalog. If the scraping leads to any metadata, a metadata edit can be performed. Otherwise, the document proceeds and is processed with the editing tool 710 to produce an attractive sample for presenting to the target merchant in the form of a sample catalog that features some of the merchant's own web site offerings. The sample catalog is then presented to the web site that is a target for soliciting sales of the service with an explanation of how an actual catalog can be developed from a plurality of access reports, wherein an access report includes content resulting from an actual user access of least one web page of the target web site.

Customized Catalog. For a discussion of a customized catalog embodiment, reference is made again to FIG. 2. Once a web site 202 has an activity message reporter 108 embedded and product information is being collected by the database server 210 of the central data collector 102, the central data collector 102 can use a component to produce consumer specific marketing materials. A merchant that sells its inventory over the Internet will have consumers 204 that purchase content and those that simply browse but do not purchase. Using the central data collector 102, information can be collected about the content that consumers 204 view. This information can be used to build customized marketing materials suitable for direct marketing.

Many web sites 202 have the ability to "recognize" previous consumers 204 via an HTTP cookie or IP address. By passing a consumer identifier to the central data collector 102 and consequently to the database server 210, the summary of each product that a specific consumer viewed on a given site is captured. This information can be used to generate marketing materials targeted to the particular consumer. This technique is particularly effective when paired with purchase information from the merchant. For example, if you have a consumer 204 that repeatedly visits a web site 202 and views a specific product several times in a short period of time, the merchant might want to send this consumer 204 a targeted email (or customized web page on their next visit), perhaps with a discount focused on a particular product to encourage them to make the purchase. Thus, the page activity reports can be processed by various filters that are designed to analyze activity data collected from the activity message reporters 108 and to rank and/or select those consumers with an activity profile that suggests readiness to purchase.

System 200 allows for a merchant to add this facility on to any existing system where the product catalog can be navigated using a web page. System 200 will work with any type of web property—commerce or non-commerce alike. In one embodiment, a small amount of JavaScript code is added to each page to transmit information about the content of the page to the database server 210. The JavaScript code includes any required data fields entered from queries of the merchant's database system. System 200 thus works well for merchants to generate customized marketing materials targeted for a single given consumer 204. This is particularly valuable for complex product configurations for which there is no standard configuration or pricing. One example of a customized product configuration is provisioning a new car or boat purchase, where the price of the item is highly dependent on the options selected.

For the purpose of illustrating the concept, a boat retailer will be used. As with the catalog example, the merchant can embed an activity message reporter 108 in each product inventory page that may be delivered to boat buyers 204. In the case of JavaScript, the JavaScript is embedded in the header of each product inventory page. While conceptually similar to the code that captures the catalog information, this JavaScript captures additional detail associated with the proposed transaction. Each time a page of offerings is delivered to the consumer 204, product information is transferred to the central data collector's 102 database server 210. As a consumer 204 begins the provisioning process, additional information is passed to the database server 210, again using the same embedded JavaScript technique. The provisioning process can be thought of as a localized shopping cart.

In the case of the boat seller, the consumer 204 first selects a model, then adds an engine configuration, then optional equipment and fittings. The central data collector 102 collects information such as a merchant ID, a customer ID, the transaction type, quantity, and the product or feature information itself. The merchant ID is a unique string supplied by the merchant to the central data collector 102, or when the central data collector 102 crawls a new merchant's site. The consumer ID is a string supplied by the merchant that uniquely identifies the consumer 204. The merchant has the flexibility to specify whether the customer ID is associated with a given time window or whether it is time independent. In one embodiment, the customer ID is set by the merchant in the form of a cookie with a unique identifier for the customer; this cookie can be set to never expire or may have a specific expiration date. The transaction type may be simply "add item" or "delete item." As consumers 204 traffic a given merchant web site 202 they will add and remove products from their shopping cart. Each of these actions causes information to be sent to the database server 210. The database server 210 collects this information for future use by the merchant.

In one embodiment, a special transaction type is used to capture consumer input that is focused on customizing a given product element. Examples of customizations include element size, element color, delivery state, and special instructions associated with the given order. Although the central data collector 102 does not need to have knowledge of whether any given order is complete for a certain application, it may be useful to capture summary order information such as shipping cost, tax, and sub-total and total information. Thus, to provide maximum flexibility the central data collector 102 captures summary transactions, if provided.

At any point in time a merchant may log into central data collector 102 to build up or edit a product brochure or custom quote for a particular consumer using the editing tool 710. When the merchant logs in, the central data collector 102 provides the merchant a summary of all captured transactions for the consumer through an interface which allows the merchant to filter by a variety of criteria such as store, time frame, or to query a specific transaction. Once the transaction (or group of transactions) to be reviewed has been selected, the central data collector 102 provides a template driven interface for the merchant to build up customized product brochures/quotes. The default option is to build up a template using the consumer observed information associated with the order; however, the merchant has flexibility to include items that may have been removed from the shopping cart, include other items from the offerings that are in an inferred catalog located in the central data collector 102, or force the central data collector 102 to add a new item to the database server 210 from their site.

Like the catalog solution, the central data collector 102 custom offering interface allows the merchant to access product information including pricing data that may not have been captured in real time by connecting to a secure section of the merchant's web site 202 or ftp site or to upload a file directly. Alternatively the merchant may customize any data element manually. The templates in the central data collector 102 provides a mechanism for the merchant to customize a message to the consumer 204, including detailed pricing information.

Once the merchant has decided on the information he wants to present to the consumer 204, the central data collector 102 provides several output options including a color PDF document, electronic mail direct to the consumer 204, and printed traditional mail directly to a specified address. The central data collector 102 also allows the merchant to email itself a data only (e.g., XML or CSV) summary of the order provided directly to the consumer 204.

When paired with an existing (typically cookie-based) system that recognizes returning visitors to a given site, merchants can select and create targeted messages for consumers 204 that "window shop" but do not consummate transactions. For example, the merchant could query the central data collector 102 for a report of the products viewed by a given set of consumer IDs that have visited the site and viewed at least 5 product pages in the last X days but not purchased. With that information a customized marketing campaign could be created that sends a targeted promotion to these consumers 204 (i.e., free shipping).

User Summaries. While bookmarks and browser history provide valuable functionality to help Internet users organize their activity and search results, they can be clumsy to use, and there is no easy mechanism for users to build summary documents that could be emailed or printed. Using the embodiments provided below, a given web site can allow users to build customized and tailored summaries of the pages that they have viewed. Although this application could be used on any type of Internet web site, this type of solution might be most applicable on a non-commerce site, such as those that provide news or other information or otherwise support research of interest to a user.

User Summary Based On One Web Site. Referring again to FIG. 1, in one embodiment, a web site 104 is in communication with a central data collector 102. This communication can be formed by the operator of the web site 104 initiating an account with the operator of the central data collector 102. An example of how this embodiment works is illustrated in the form of a news-oriented site. The news oriented site embeds each story with an activity message reporter 108 as described above that facilitates communication between the user's browser directed to that site and the central data collector 102.

The embedded activity message reporter 108 can contain a user ID field. Each time a user 106 requests a page from an enabled web site 104, the central data collector 102 tracks the request. Depending on how the originating web site 104 implements the technology, this solution can be deployed either in the foreground or background, which determines if the user 106 needs to take any action to enable the tracking. The central data collector 102 accepts a transaction code "add" or "ignore" associated with a given customer ID. If the transaction code is ignored, the central data collector 102 does not track the content. This allows a given web site 104 to provide options to the user 106 to track specific pages or turn tracking on globally. If the implementing web site 104 wants the tracking to go on in the background, the web site 104 administrator sets the transaction code to always be "add."

At any point the implementing web site 104 can request a summary of viewed content for a given customer ID. In one embodiment, it is possible for the user 106 to directly request the summary of viewed content. The central data collector 102 provides several options for accessing previously viewed content. When a summary of viewed content is requested, the user 106 is redirected to a similar template driven user interface that the web site administrator uses to build custom product summaries, based on one or more summary templates 116. This interface may provide formatting such as cover pages, table of contents, page numbers, and the ability to lay out the content as it makes sense for the user 106. The interface may also permit sorting and categorizing by date, content, topic frequency or other parameters so that the summary may be tailored to what the user wants to discern from the past activity.

The templates provide the option for simply displaying in various formats the information that was captured in real-time. Alternatively the central data collector 102 provides the option for the user 106 to request a customized crawl of the source web site 104 for more information than might have been captured in real-time. Once the content has been laid out, the central data collector 102 provides several output options including a color PDF document, electronic mail direct to the user 106, and printed traditional mail directly to a specified address.

In another embodiment, the process of creating user summary documents could be used by groups of individuals collaborating on a project and using one web site with the activity message reporter 108. The summary could then show the collective result of group activity. If necessary, the central data collector 102 would perform a real-time query of the web site 104 for any additional content that is required to generate the document. This content would be provided to the user 106 using site specific summary templates which allow the user 106 to select/augment/remove content and format the documents in a manner suitable for their application. Once complete, the document can either be provided directly to a user 106 in a PDF document or emailed to a specific user 106. This can be also be distributed to all group members.

User Summary Based On Multiple Web Sites On Web Site's End In this embodiment, a plurality of web sites 104 are equipped to cause activity reports for communication with a central data collector 102. This plurality of web sites 104 or network of web sites 104 have either one account or multiple accounts with the central data collector 102. Each of the plurality of web sites 104 have at least one activity message reporter 108. In one embodiment, the activity message reporter 108 is embedded JavaScript code on the web sites 104 respective web pages. The JavaScript code facilitates communication between the user's browser directed to the plurality of web sites 104 and the central data collector 102.

The embedded JavaScript can contain a user ID. Each time a user 106 requests a page from one of the plurality of web sites 104, the central data collector 102 tracks the request. Depending on how the originating web site 104 implements the technology, this solution can be deployed either in the foreground or background, which determines if the user 106 needs to take any action to enable the tracking. The central data collector 102 accepts a transaction code "add" or "ignore" associated with a given customer ID. If the transaction code is ignored, the central data collector 102 does not track the content. This allows a given web site 104 from the plurality of web sites 104 to provide options to the user 106 to track specific pages or turn tracking on globally. If the implementing web site 104 wants the tracking to go on in the background, the web site 104 administrator sets the transaction code to always be "add."

At any point the implementing web site 104 can request a summary of viewed content for a given customer ID for that particular implementing web site 104. Alternatively, the implementing web site 104 can request a summary of viewed content for a given customer ID across the plurality of web sites 104, assuming the implementing web site 104 has approval that addresses any privacy issues. In one embodiment, it is possible for the user 106 to directly request the summary of viewed content. The central data collector 102 provides several options for accessing previously viewed content. When a summary of viewed content from the plurality of web sites 104 is requested, the user 106 is redirected to a similar template driven user interface that the web site administrator uses to build custom product summaries. This interface provides formatting such as cover pages, table of contents, page numbers, and the ability to layout the content as it makes sense for the user 106.

The templates 116 provide the option for simply displaying the information that was captured in real-time. Alternatively the central data collector 102 provides the option for the user 106 to request a customized crawl of the plurality of web sites 104 for more information than might have been captured in real-time. Once the content has been laid out, the central data collector provides several output options including a color PDF document, electronic mail direct to the user 106, and printed traditional mail directly to a specified address.

User Summary On User's End. In this embodiment, users 106 themselves can take advantage of the user summary functionality on any HMTL-based web site by installing either a Windows system tray application or browser extension. As part of the installation process the user 106 must sign up for an account with the central data collector 102. The act of signing up creates a unique user key which is embedded in the code that is transmitted to the database server 210. These applications allow a given user 106 to turn page tracking on or off globally or capture a given page. As with the embedded solution each time a web page is requested the content of the page is sent to the database server 210. The installed application intercepts each web page prior to being rendered, parses the content, and inserts the requisite activity message reporter 108 which transmits the contents of the page to the database server 210 of the central data collector 102. At the user's 106 discretion he/she may access the summary of viewed content by logging into the central data collector 102. At that point he/she is afforded the option to build out a summary of his/her content as described in the preceding paragraphs, and below with respect to FIG. 5. In this scenario the central data collector 102 provides a mechanism for organizing and publishing content from multiple web sites 104.

All of the embodiments described above with respect to user summaries are relatively easy to implement by adding an activity message reporter 108 to web pages. The central data collector 102 retrieves the necessary information from the activity message reporter 108 and allows for the formatting and processing of the information, without the need for the web site administrator to transfer information regarding product inventory, electronic files or other information contained on their web site 104.

Figure 5:
FIG. 5 is a diagram showing a sample tailored summary derived from a user's web site activity.

FIG. 5 is a diagram showing a sample tailored summary screen shot derived from a user's web site activity. In this embodiment, a user interface 502 allows the customer to page through his/her results and see a compressed version of the site, optionally add metadata about each page such as a title or notes 510, order each list of results, enable or disable a given site, and augment the results list with manually added sites. The compressed preview version of each site is populated with HTML code and augmented by images that are retrieved from the Internet in real-time collected by the central data collector 102. The interface 502 also allows the user to update the content of a given web page with current information retrieved from the Internet. Once the user is satisfied with the layout of the result set he/she can export the output to a PDF document by selecting a PDF option 504 or publish the site to an HTML document by selecting a publish web site option 506. If the user selects the PDF option 504, he/she is directed through to the workflow that (referenced previously) allows the user to lay out the content page using one of the central data collector's 102 templates. The publish web site option 506 and a print option 508 have related functionality: publish to website 506 takes each page and lays it out sequentially inserting a page break between each site; and the print option 508 prints a sequential view of the HTML output. In this way the user is able to produce a visually appealing "book" summarizing the results of a given Internet session (or sessions). The user can produce a version of this content exactly as it was originally seen or as it exists at the moment where the report is generated. The output can easily be "massaged" by an individual with minimal technical skills such that with little effort the pages can be made into a presentable report suitable for printing, email distribution, or other use in a business or personal context.

Although the invention has been described with reference to embodiments, persons skilled in the art will recognize that changes may be made in form and detail without departing from the spirit and scope of the invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method of aggregating data from pages viewed by a user of at least one web site, comprising:
   receiving from at least one activity message reporter a plurality of access reports wherein an access report identifies content from at least one web page of the at least one web site viewed in a given period by a user during an access reported and such report is initiated by a reporting trigger coded in the message reporter;

accumulating the received access reports;

collecting from the at least one web site content that is identified in but not included in the access reports received, said collecting occurring at a time asynchronous with receiving the access report identifying the content;

formatting content collected based on the received access reports in accordance with a document template; and providing the formatted content to at least one of an operator of or a user of the at least one web site outside of the given period during which an access is reported.

2. The method of claim 1 wherein the document template is a merchant catalog template.

3. The method of claim 1 wherein the document template is a customized catalog template.

4. The method of claim 1 wherein the document template is a user summary template.

5. The method of claim 1 further comprising generating metadata from the received access reports that is data about the content identified in the access reports.

6. The method of claim 5 further comprising adjusting the accumulated received access reports as a function of the metadata.

7. The method of claim 1 further comprising providing the at least one of an operator of or a user of the at least one web site access to an editing tool to edit the formatted received access reports.

8. The method of claim 1 wherein the at least one activity message reporter is embedded on the at least one web page from which content is identified.

9. The method of claim 8 wherein the activity message reporter is JavaScript code.

10. The method of claim 1 further comprising using an editing tool for generating a final document from the formatted content and sending the generated final document to a merchant associated with the at least one web site.

11. The method of claim 10, wherein the at least one web site is a target for soliciting sales of a service for providing a catalog developed from the plurality of access reports, wherein an access report includes content resulting from an actual user access of least one web page of the at least one web site.

12. The method of claim 10, wherein the final document is a sample catalog and further comprising including with the final document an offer to provide a catalog developed from the plurality of access reports.

13. A method of generating marketing materials based on at least one user's activity on a merchant web site, the method comprising:

collecting real-time product information for one or more products viewed by the at least one user on the merchant web site during a given period to infer a merchant's product offerings;

storing the real-time product information for products viewed;

collecting from the merchant web site additional product information that is identified in but not included in the real-time product information received, said collecting occurring at a time asynchronous with receiving the real-time product information;

formatting the stored product information containing real-time product information for the various products of the merchant's product offerings supplemented with the asynchronously collected, additional product information;

generating marketing materials from the formatted stored and asynchronously collected additional product information; and providing the generated marketing materials to at least one of an operator or a user of the merchant web site outside of the given period during which real-time product information is collected.

14. The method of claim 13 further comprising providing the merchant an editing tool to add additional products to the merchant's product offerings inferred from the real-time product information.

15. A method of generating a customized marketing material, the method comprising:

receiving a user identifier for a user;

monitoring the user's activity on a merchant web site for a given period;

collecting real-time product information for products viewed by the user on the merchant web site over a given period to infer a merchant's product offerings;

storing the collected real-time product information for products viewed;

formatting the stored product information for the various inferred products of the merchant's product offerings using a stored document template and further content from the merchant web site that is identified but not included in the real-time product information collected, said further content being obtained at a time asynchronous with receiving the real-time product information; and generating marketing materials from the formatted stored product information and further content, customized to the user outside of the given period during which real-time product information is monitored.

16. The method of claim 15 wherein the act of collecting real-time product information for products viewed by the user can be turned on or off by the user.

17. The method of claim 15 further comprising crawling the merchant web site for additional content information for formatting.

18. A system for dynamically building documents based on observed access to web site content by at least one user, the system comprising:

an activity message reporter embedded in at least one web page of at least one web site, wherein the activity message reporter is stored on a computer readable medium and executable by a processor to report data describing the at least one user's viewing activity on the at least one web page for a given period; and a central data collector comprising a processor and program code stored on a computer readable medium and adapted to collect for the given period information contained on the at least one web page viewed by the at least one user from the activity message reporter embedded on the at least one web page without accessing the web site's database wherein said activity message reporter comprises a trigger for generating a message for transmittal and said collector is configured to collect a portion of the information at a time asynchronous with and after receiving the message from the activity message reporter.

19. The method of claim 1 wherein the step of receiving a plurality of access reports comprises receiving access reports with one or more content pointers and further comprising controlling use of a plurality of content pointers to a specific piece of content with logic that initiates only one request to the web site containing the content to retrieve the content, even if similar or identical content pointers have been received in the given period.

20. The method of claim 1 wherein the step of receiving a plurality of access reports comprises receiving access reports with one or more content pointers and the method further comprises receiving in an access report at least one content pointer message encrypted to deter the user from decrypting the content pointer to access the corresponding content.

21. The method of claim 1 wherein the step of receiving a plurality of access reports comprises receiving access reports with one or more content pointers and further comprising receiving from the at least one web site parameters to specify when a central data collector service is permitted to or not permitted to query for content identified by one or more content pointers.

22. The method of claim 21 wherein the step of receiving from the at least one web site parameters to specify when a central data collector service is permitted to or not permitted to query for content comprises receiving the parameters in an access report.

23. The method of claim 21 wherein the step of receiving from the at least one web site parameters to specify when the central data collector service is permitted to or not permitted to query for content comprises receiving the parameters for a crawler controller for controlling an asynchronous connection to the web site to retrieve the content.

24. The method of claim 21 further comprising receiving from the at least one web site parameters to specify one or more time intervals when the central data collector is or is not permitted to access one or more pieces of content identified by the one or more content pointers.

25. The method of claim 1 wherein the step of receiving a plurality of access reports comprises receiving access reports with one or more content pointers and further comprising controlling a crawler to reduce the processing or bandwidth required to retrieve content by inhibiting programmed accessing of content for which no content pointer has been received in a given time interval.

26. The method of claim 1 further comprising receiving from the at least one web site parameters to specify at least one threshold to define a number of requests for given content required in a given period before retrieval of the given content is initiated.

27. The method of claim 1 wherein the step of receiving a plurality of access reports comprises receiving access reports with one or more content pointers and further comprising determining the time distribution of receipt of access reports from a web site, and responsive to the time distribution, scheduling asynchronous access to retrieve content referenced by content pointers to that web site during low usage periods of the web site.

28. A computer program product embodied in a computer readable medium, having computer readable program code embodied in a computer readable medium executable by a processor for generating customized marketing materials, comprising:
code for performing the following steps:
receiving a user identifier for a user;
monitoring the user's activity on a merchant web site for a given period;
collecting real-time product information for products viewed by the user on the merchant web site over a given period to infer a merchant's product offerings;
storing the collected real-time product information for products viewed;
formatting the stored product information for the various inferred products of the merchant's product offerings using a stored document template and further content from the merchant web site that is identified but not included in the real-time product information collected, said further content being obtained at a time asynchronous with receiving the real-time product information; and
generating marketing materials from the formatted stored product information and further content, customized to the user outside of the given period during which real-time product information is monitored.

29. The computer program product of claim 28 wherein the real-time product information for products viewed comprises a plurality of content pointers and further comprising code for controlling use of the plurality of content pointers to a specific piece of content with logic that initiates only one request to the web site containing the content to retrieve the content, even if similar or identical content pointers have been received in a given period of time.

30. The computer program product of claim 28 wherein the real-time product information for products viewed comprises at least one content pointer message encrypted to deter the user from decrypting the content pointer to access the corresponding content.

31. The computer program product of claim 28 further comprising code for receiving from the merchant web site parameters to specify when a central data collector service is permitted to or not permitted to query for content identified by one or more content pointers.

32. The computer program product of claim 31 wherein the code for receiving from the merchant web site parameters to specify when a central data collector service is permitted to or not permitted to query for content comprises code for receiving the parameters in an activity report.

33. A computer program product embodied in a computer readable medium, having computer readable program code embodied in a computer readable medium executable by a processor, comprising:
code for collecting data from pages viewed by a user of at least one web site;
code for receiving from at least one activity message reporter a plurality of access reports wherein an access report identifies content from at least one web page of the at least one web site viewed in a given period by a user during an access reported and is initiated by a reporting trigger coded in the message reporter;
code for accumulating the received access reports;
code for collecting from the at least one web site content that is identified in but not included in the access reports received, said collecting occurring at a time asynchronous with receiving an access report identifying the content; and
code for formatting content from the received access reports and content asynchronously collected in accordance with a document template.

34. The computer program product of claim 33 wherein the document template is a merchant catalog template.

35. The computer program product of claim 33 wherein the document template is a customized catalog template.

36. The computer program product of claim 33 wherein the document template is a user summary template.

37. The computer program product of claim 33 further comprising code for generating metadata from the received access reports that is data about the content identified in the access reports.

* * * * *

UNITED STATES PATENT AND TRADEMARK OFFICE
CERTIFICATE OF CORRECTION

| | | Page 1 of 1 |
|---|---|---|
| PATENT NO. | : 8,543,457 B2 | |
| APPLICATION NO. | : 11/438976 | |
| DATED | : September 24, 2013 | |
| INVENTOR(S) | : William E. Staib and Dean Scott Blodgett | |

It is certified that error appears in the above-identified patent and that said Letters Patent is hereby corrected as shown below:

CLAIMS

| Column | Line | PTO | Should Read |
|---|---|---|---|
| 21 | 59 | "code for performing the following steps:" | -- code for performing the following method steps -- |

Signed and Sealed this

Seventeenth Day of December, 2013

Margaret A. Focarino
*Commissioner for Patents of the United States Patent and Trademark Office*